(12) United States Patent
Bellis, Jr.

(10) Patent No.: US 6,921,238 B2
(45) Date of Patent: Jul. 26, 2005

(54) DRIVABLE TRAILER

(76) Inventor: William B. Bellis, Jr., 1401 Schuff La., Louisville, KY (US) 40205

( * ) Notice: Subject to any disclaimer, the term of this patent is extended or adjusted under 35 U.S.C. 154(b) by 462 days.

(21) Appl. No.: 10/161,932

(22) Filed: Jun. 4, 2002

(65) Prior Publication Data

US 2003/0147732 A1 Aug. 7, 2003

Related U.S. Application Data

(60) Provisional application No. 60/355,446, filed on Feb. 7, 2002.

(51) Int. Cl.[7] .................................................. B65F 9/00
(52) U.S. Cl. ....................... 414/345; 414/373; 180/14.1
(58) Field of Search ................................. 414/340, 345, 414/373; 180/14.1, 14.2

(56) References Cited

U.S. PATENT DOCUMENTS

| 2,487,508 | A | 11/1949 | Anderson |
|---|---|---|---|
| 2,495,449 | A | 1/1950 | Francis |
| 4,700,798 | A | 10/1987 | Johansson et al. |
| 4,998,594 | A | 3/1991 | Orloski |
| 5,536,131 | A | 7/1996 | Behr |
| 5,810,544 | A | 9/1998 | Wellman |

OTHER PUBLICATIONS

"Tow Bar and Flat Tire Dolly" On–Line. Web–Site—www.brackettaircraft.com at least as early as May 2, 2002.

"Motorcycle Caddy" On–Line. Web Site—www.motorcycleramps.com at least as early as May 2, 2002.

"Go Jak" On–Line. Web Site—www.autotoolsexpress.com at least as early as May 2, 2002.

"Triple L Trailers", Brochure of Premco Products, Inc., La Verne, CA 91750 at least as early as Mar. 2002.

*Primary Examiner*—John Q. Nguyen
(74) *Attorney, Agent, or Firm*—Camoriano and Associates; Theresa Fritz Camoriano

(57) ABSTRACT

A trailer which can be used to tow a vehicle and which can be towed by the same vehicle while that vehicle is inside the trailer and lowered down to ground level.

15 Claims, 36 Drawing Sheets

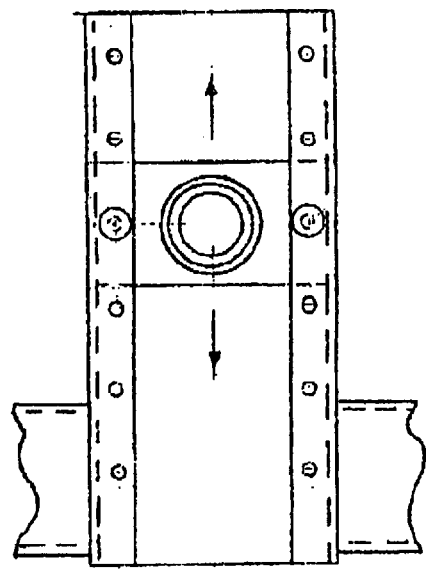
FIG. 13
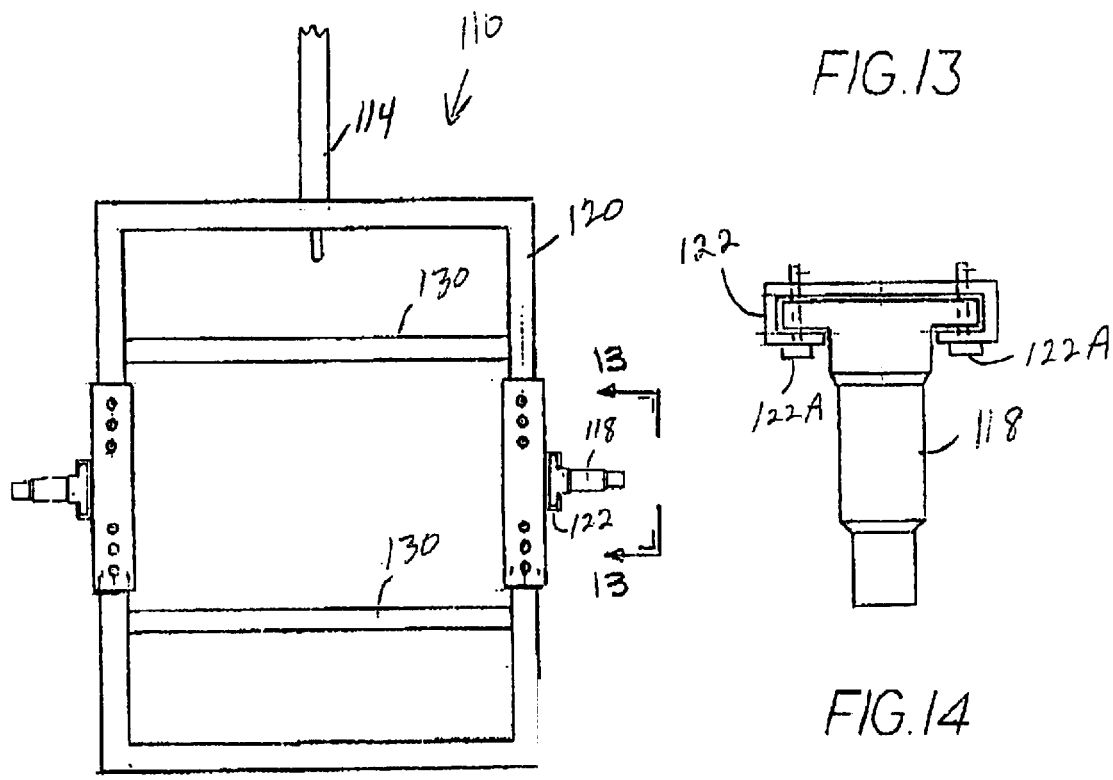
FIG. 12
FIG. 14

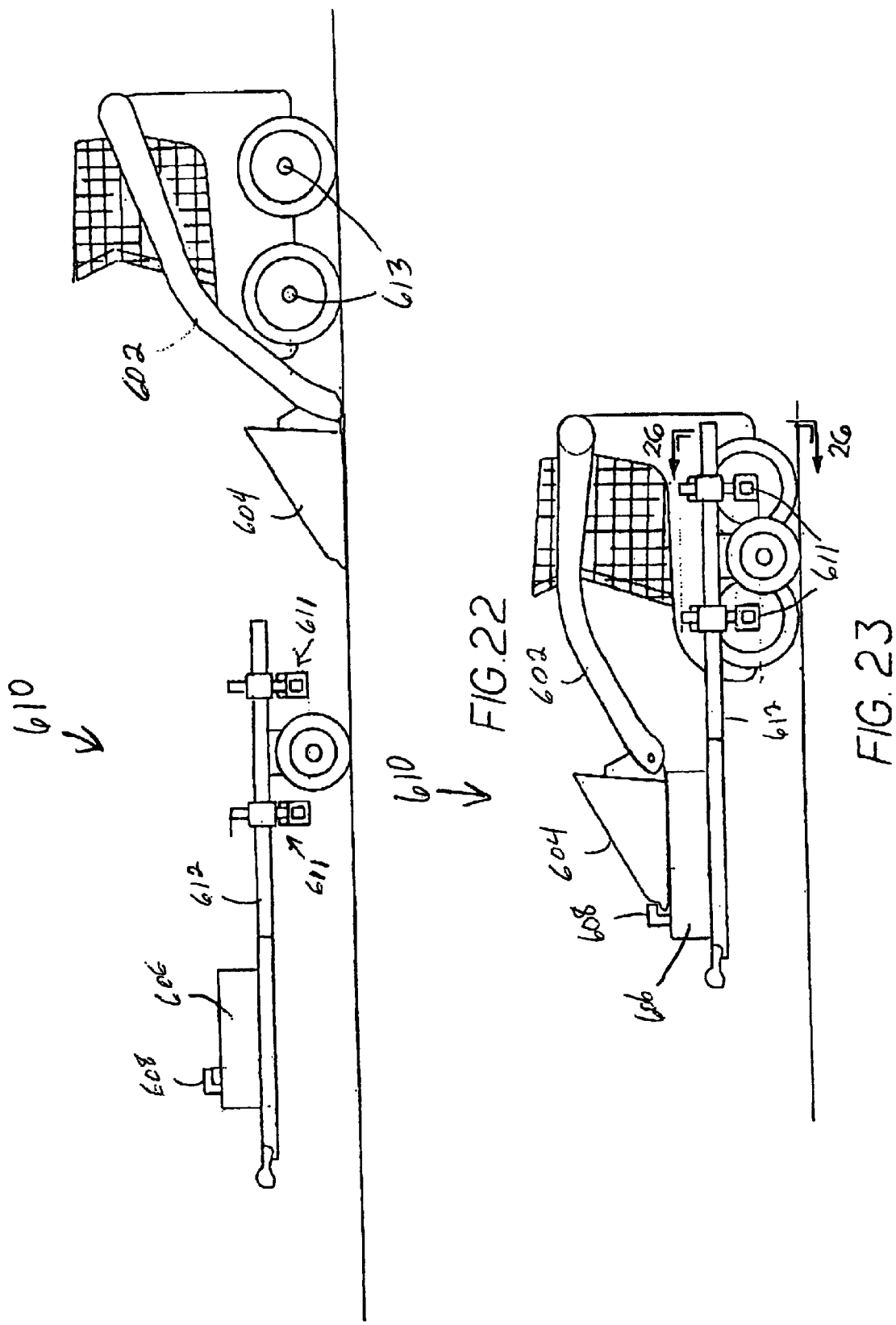

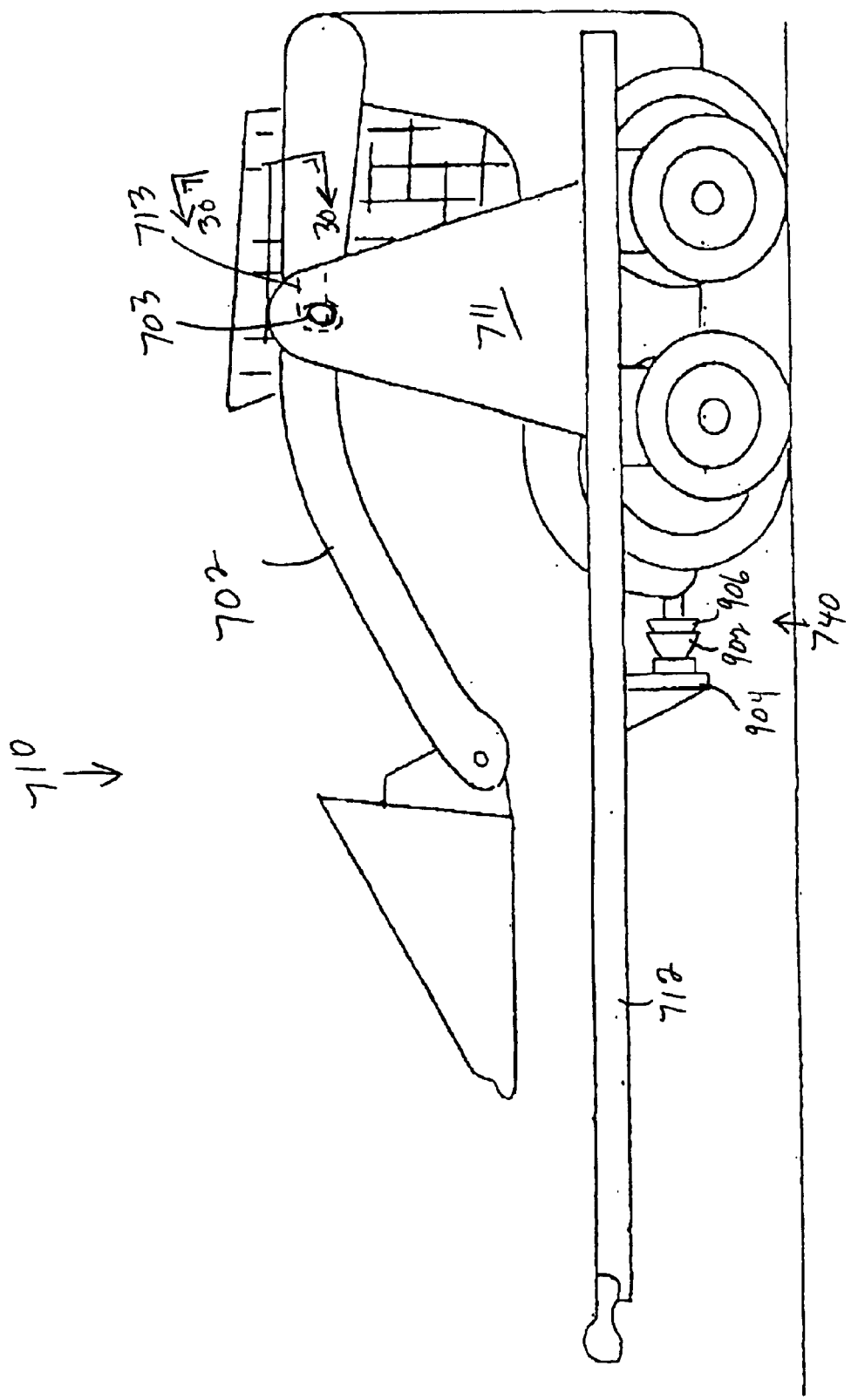

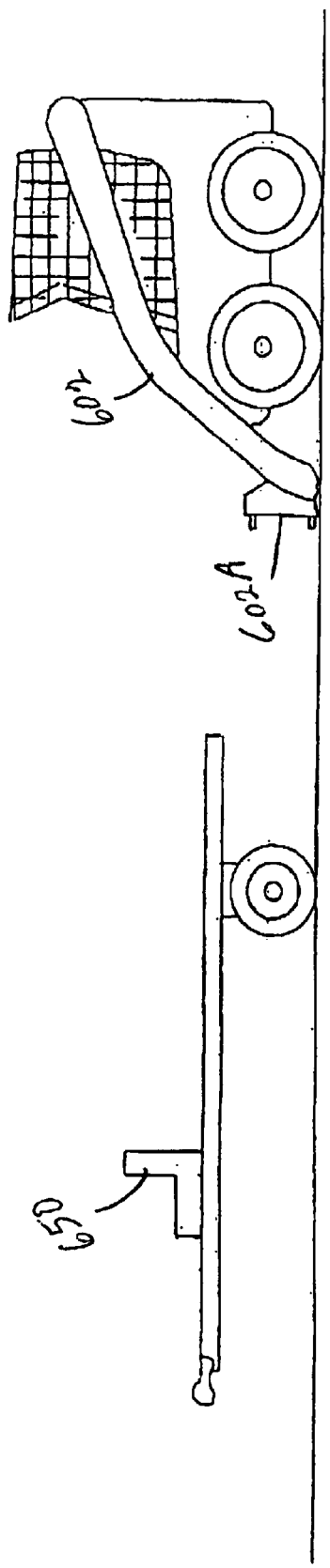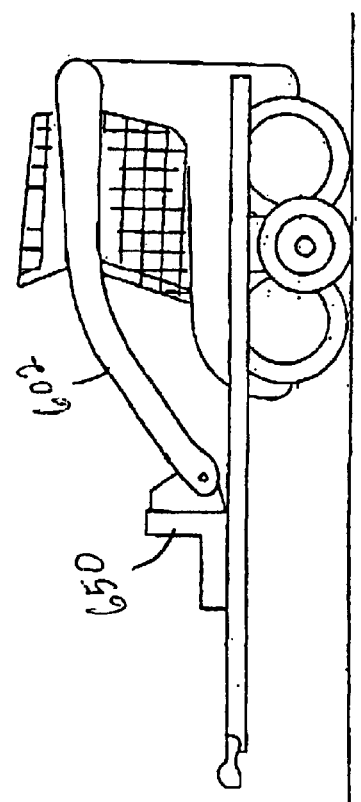
FIG. 33
FIG. 34

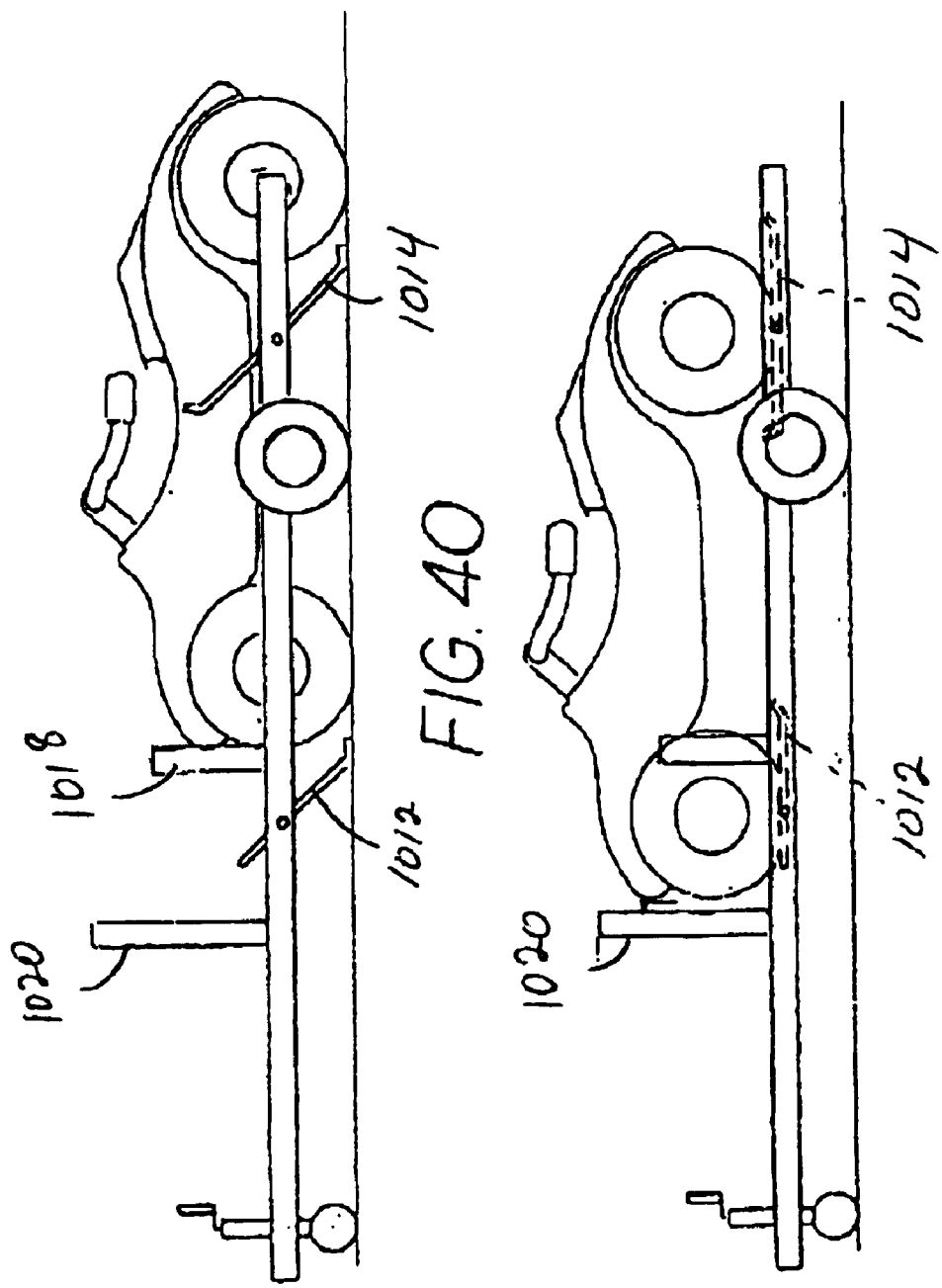

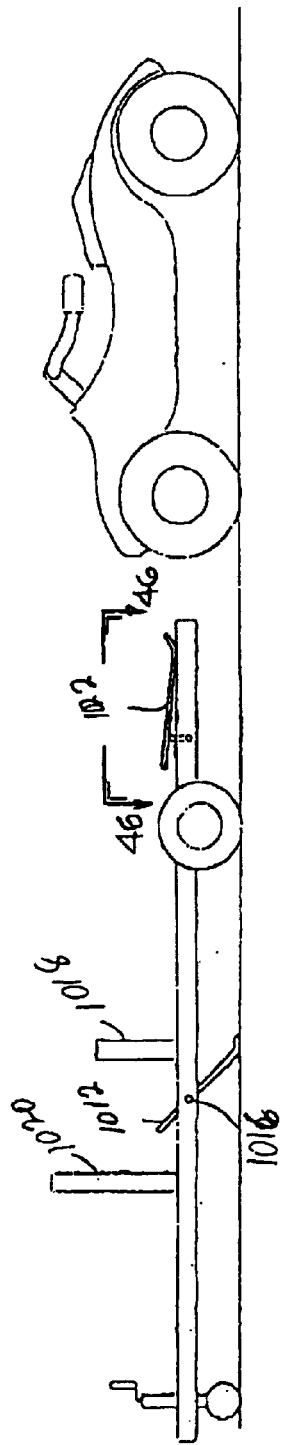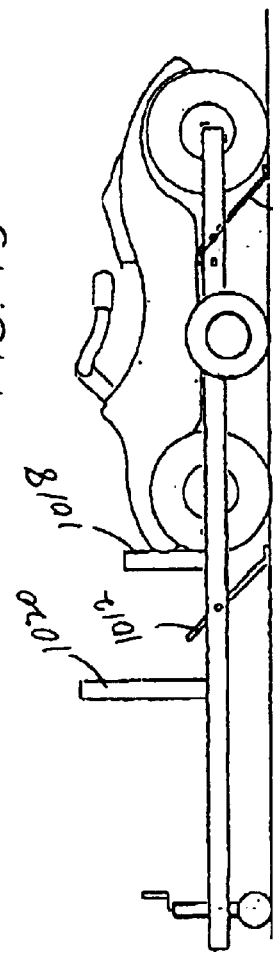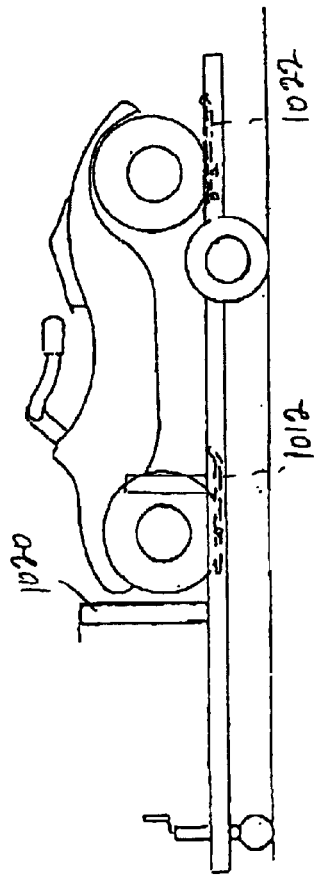

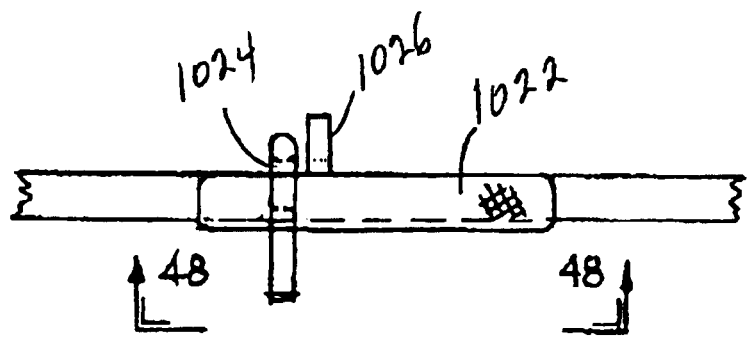
FIG. 46
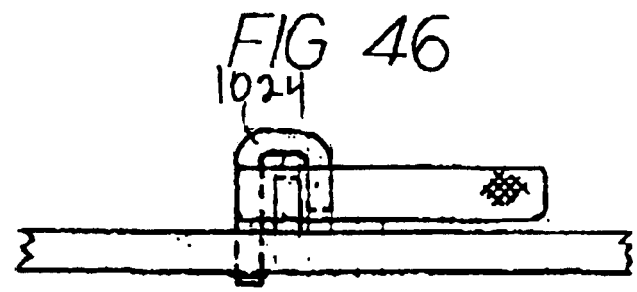
FIG. 47
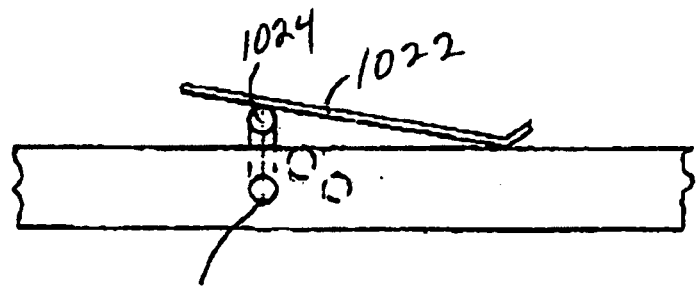
FIG. 48
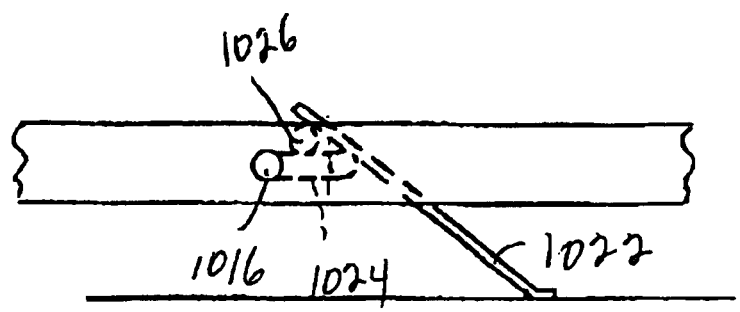
FIG. 49

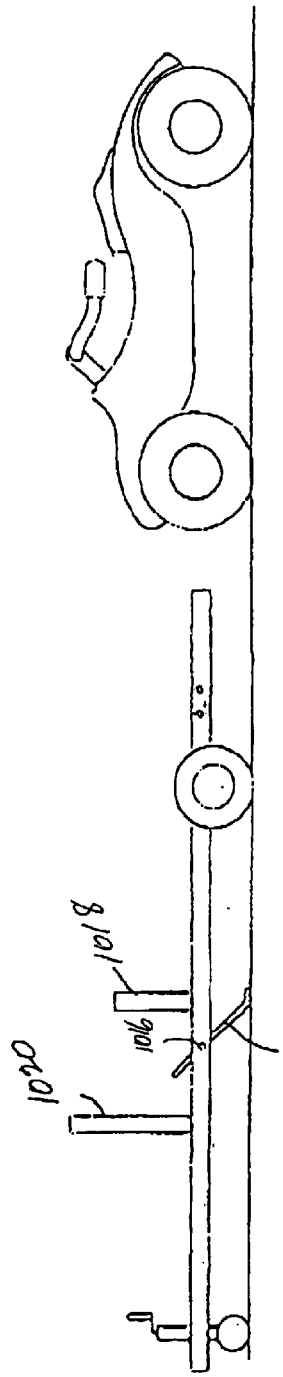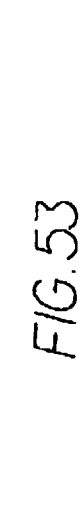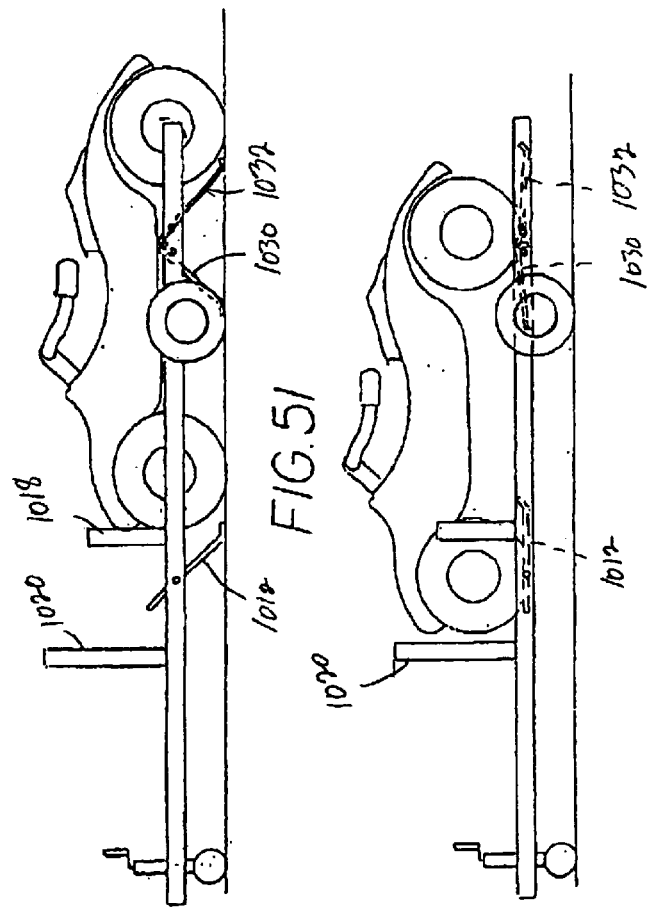

DRIVABLE TRAILER

This application claims priority from U.S. Provisional Application Ser. No. 60/355,446, filed on Feb. 7, 2002.

BACKGROUND OF THE INVENTION

The present invention relates to trailers, and, in particular to a trailer intended to carry a vehicle.

There are many types of vehicles, such as golf carts, tracked vehicles, and all-terrain vehicles (ATVs), that are not intended to be driven on the open road. In order to get these vehicles from one place to another, they typically are carried in a trailer. However, loading the vehicle onto the trailer and aligning the towing vehicle with the trailer are time-consuming tasks which make it undesirable to use the vehicles. For example, a hunter may leave his ATV at home if he is only going for a half-day trip, since the tasks associated with taking the ATV along are too time consuming.

It is known in the art to provide a trailer with a platform that can be lowered down to allow a vehicle to be driven onto the trailer and can then be raised to tow the vehicle. Such trailers are shown, for example, in U.S. Pat. No. 5,536,131 "Behr" and U.S. Pat. No. 5,810,544 "Wellman", which are hereby incorporated by reference. These trailers may even provide a mechanism for securing the vehicle to the trailer, as, for example, the Wellman reference has tie-down eyelets 39. However, these trailers are not made in a manner that permits the towed vehicle to drive the trailer while it is inside the trailer. Both in the raised and in the lowered positions, the tires or other driving feet of the vehicle are unable to contact the ground in a manner that would permit them to drive the trailer.

Other trailers are made to raise and lower to help lift freight to be carried on the trailer. Examples of these are U.S. Pat. No. 2,495,449 "Francis" and U.S. Pat. No. 2,487,508 "Anderson", which are hereby incorporated by reference.

Unitec Go Jak is a dolly with a jack that can be used to lift and manually move a vehicle on caster wheels. The vehicle tires do not drive the dolly. This dolly is not a trailer, does not have any type of towing tongue, and is not intended to be towed behind a vehicle.

There are also driver training tools, which can be used to help a driver simulate skid conditions while driving an automobile. Such devices are shown in U.S. Pat. No. 4,700,798 "Johansson" and U.S. Pat. No. 4,998,594 "Orloski", which are hereby incorporated by reference. These devices are not trailers, and they have no type of towing tongue to permit them to be connected to a towing vehicle. Instead, they are secured onto the frame of the vehicle and travel with the vehicle. The instructor can use the hydraulic lifts in these devices to raise and lower the vehicle in order to simulate skid conditions.

SUMMARY OF THE INVENTION

The present invention provides a trailer which can be driven and steered by the vehicle that is carried on the trailer. That vehicle is referred to herein as the towed vehicle. Being able to use the towed vehicle to drive the trailer makes it much easier to align the trailer with the towing vehicle as well as to maneuver the trailer into position for storage. It is no longer necessary to back up the towing vehicle to the trailer. Instead, the trailer can be driven to the towing vehicle. Also, the trailer can be stored in places and in orientations that are inaccessible by the towing vehicle.

Various embodiments of the invention are shown herein. In each case, when the towed vehicle is on the ground and is secured to the trailer, it can drive the trailer. When the towed vehicle is raised off of the ground, a towing vehicle can connect to the towing tongue and tow both the trailer and the raised, towed vehicle.

BRIEF DESCRIPTION OF THE DRAWINGS

FIG. 12 is a partially broken away plan view of an alternate embodiment of a trailer made in accordance with the present invention, in which the carrier frame is raised and lowered relative to the stub axles of the trailer wheels;

FIG. 13 is a view along line 13—13 of FIG. 12;

FIG. 14 is a plan view of the track and stub shaft of FIG. 13;

FIG. 22 is a side view of another alternative embodiment of a trailer made in accordance with the present invention, for use with a vehicle with movable arms, also showing a vehicle to be carried by the trailer;

FIG. 23 is a side view of the trailer and vehicle of FIG. 22, with the vehicle inside the trailer;

FIG. 29 is the same view as FIG. 28 but with the vehicle secured in the trailer;

FIG. 33 is a side view of another trailer and vehicle having movable arms;

FIG. 34 is a side view of the trailer and vehicle of FIG. 33, with the vehicle in the trailer;

FIG. 40 is the same view as FIG. 39 but with the vehicle in driving position in the trailer;

FIG. 41 is the same view as FIG. 40, but with the vehicle up on both sets of trailer ramps;

FIG. 43 is a side view of a trailer using the alternate rear ramp of FIG. 42;

FIG. 44 is the same view as FIG. 43 but with the vehicle in driving position in the trailer;

FIG. 45 is the same view as FIG. 44 but with the vehicle up on both sets of ramps;

FIG. 46 is a view taken along the line 46—46 of FIG. 43;

FIG. 47 is the same view as FIG. 46 but with the rear ramp shifted into the extended position to be used;

FIG. 48 is a view taken along the line 48—48 of FIG. 46;

FIG. 49 is a view taken along the line 49—49 of FIG. 47;

FIG. 50 is a side view of another embodiment of a trailer similar to the previous embodiment but using an alternative type of rear ramp;

FIG. 51 is the same view as FIG. 50 but with the vehicle having driven over the rear ramps;

FIG. 52 is the same view as FIG. 51 but with the vehicle having driven up both the front and rear ramps;

FIG. 53 is an enlarged view of the rear ramp portion of FIG. 51;

DESCRIPTION OF THE PREFERRED EMBODIMENTS

Figure 1:
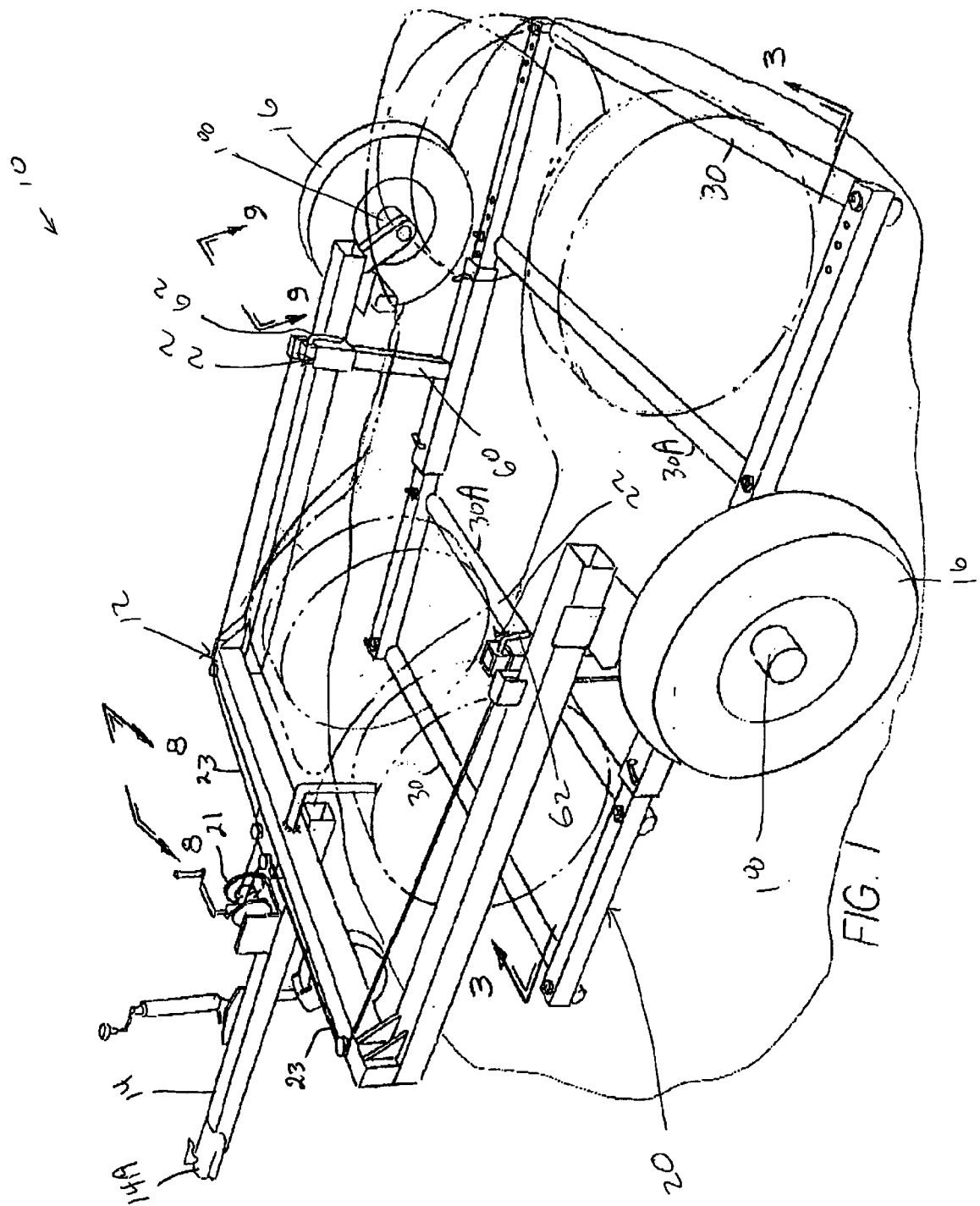
FIG. 1 is a perspective view of a first example of a trailer made in accordance with the present invention, with a carrier frame in a lowered position and a towed vehicle shown in phantom.

The trailer 10 of FIGS. 1–11 has a main frame 12, including a towing tongue 14 with a hitch or coupler 14A at its free end. The main frame 12 has a generally "U" shape, with a front side, left and right sides, and an open back through which the towed vehicle enters the trailer. While the towing tongue 14 shown here is a straight towing tongue, it is understood that other known types of towing tongues and other types of hitches, such as a gooseneck or a fifth wheel tongue and hitch or a pintle hitch, may also be used with the present invention.

The main frame 12 is supported on two wheels 16, which are carried on stub axles 18. A movable frame 20 is mounted on the main frame 12. The movable frame 20 rides up and down in tracks 22 on the main frame and is used to carry the towed vehicle.

Figure 2:
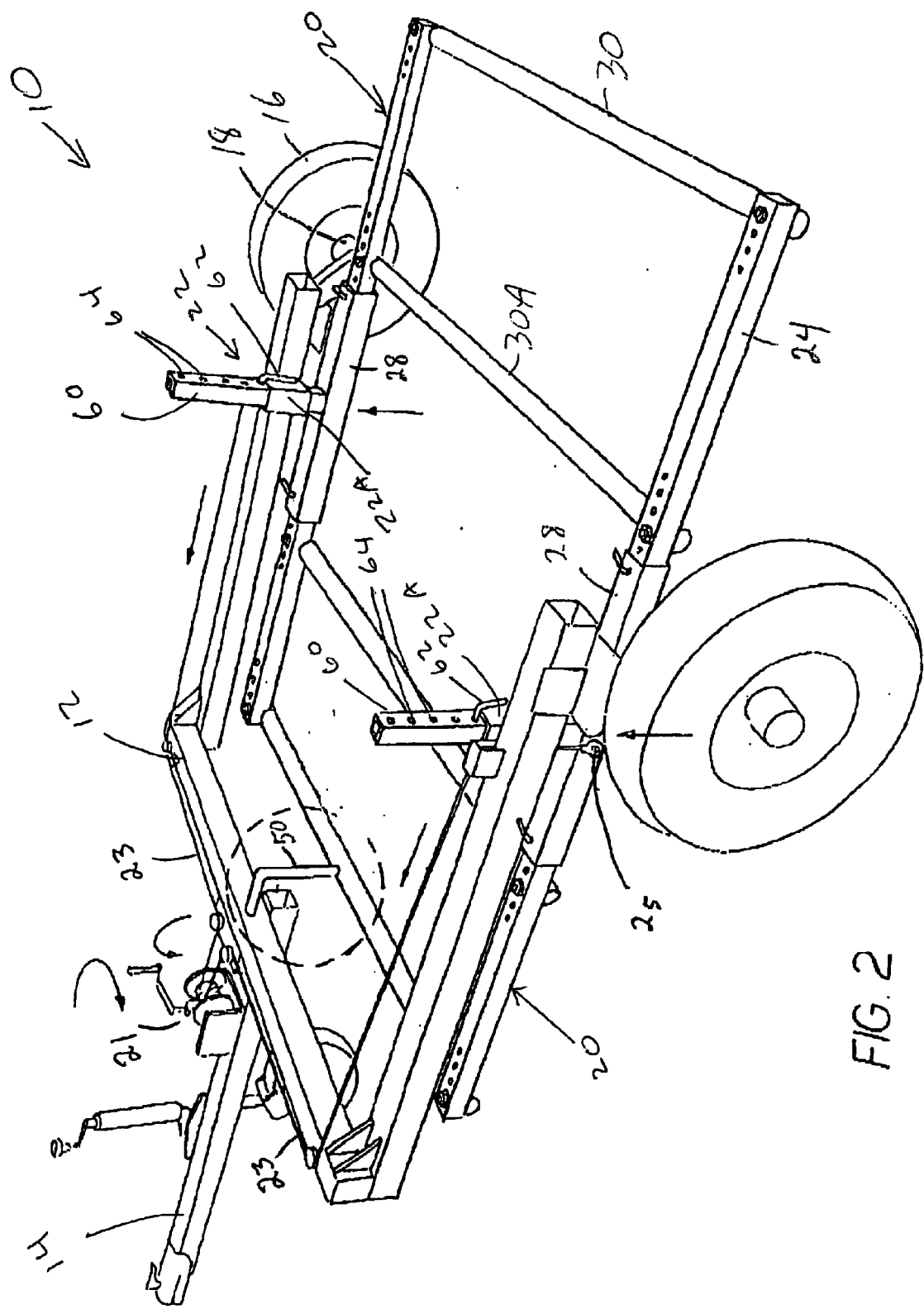
FIG. 2 is the same view as in FIG. 1 but with the carrier in a raised position.
Figure 7:
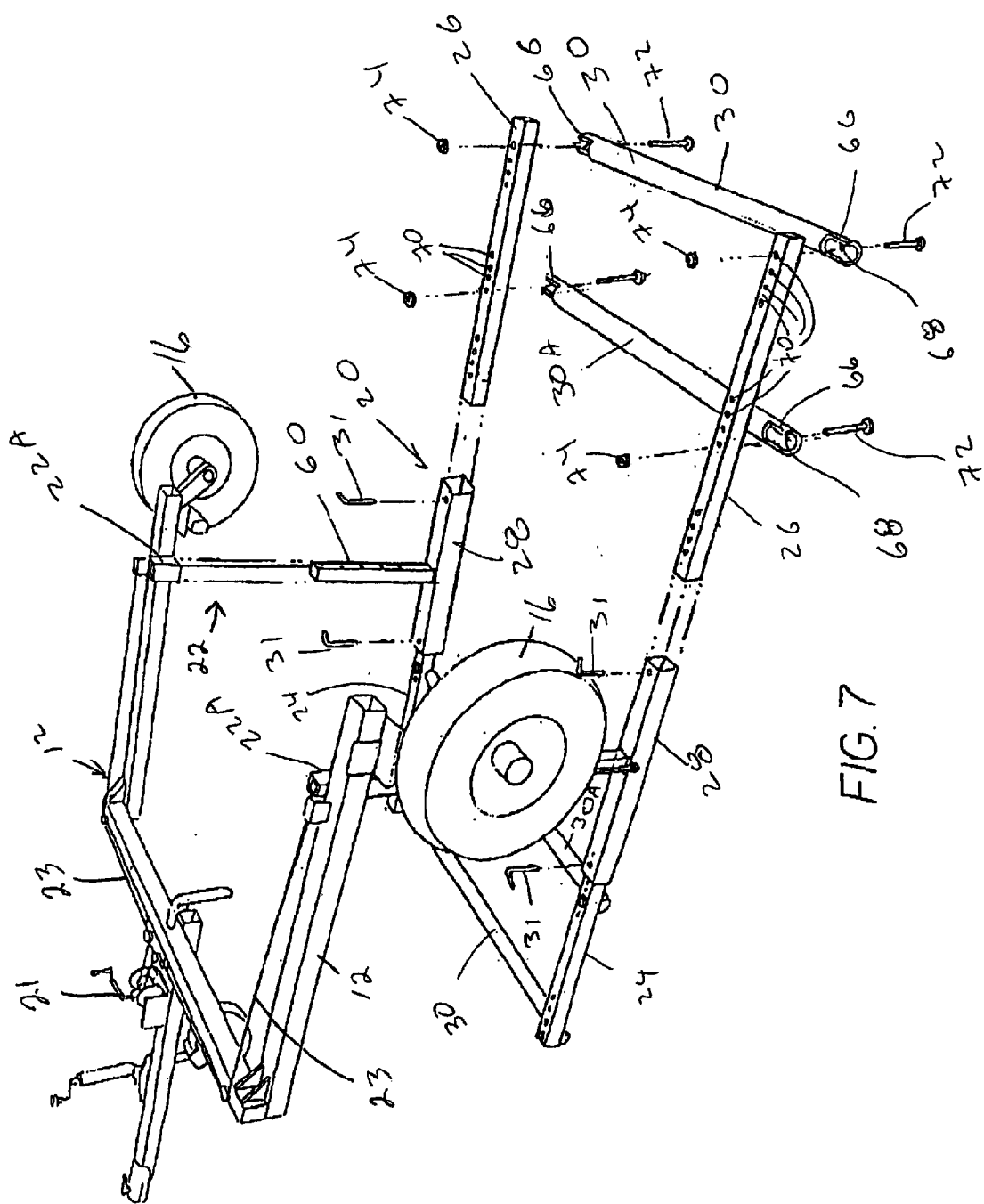
FIG. 7 is a partially exploded perspective view of the trailer of FIG. 1.
Figure 9:
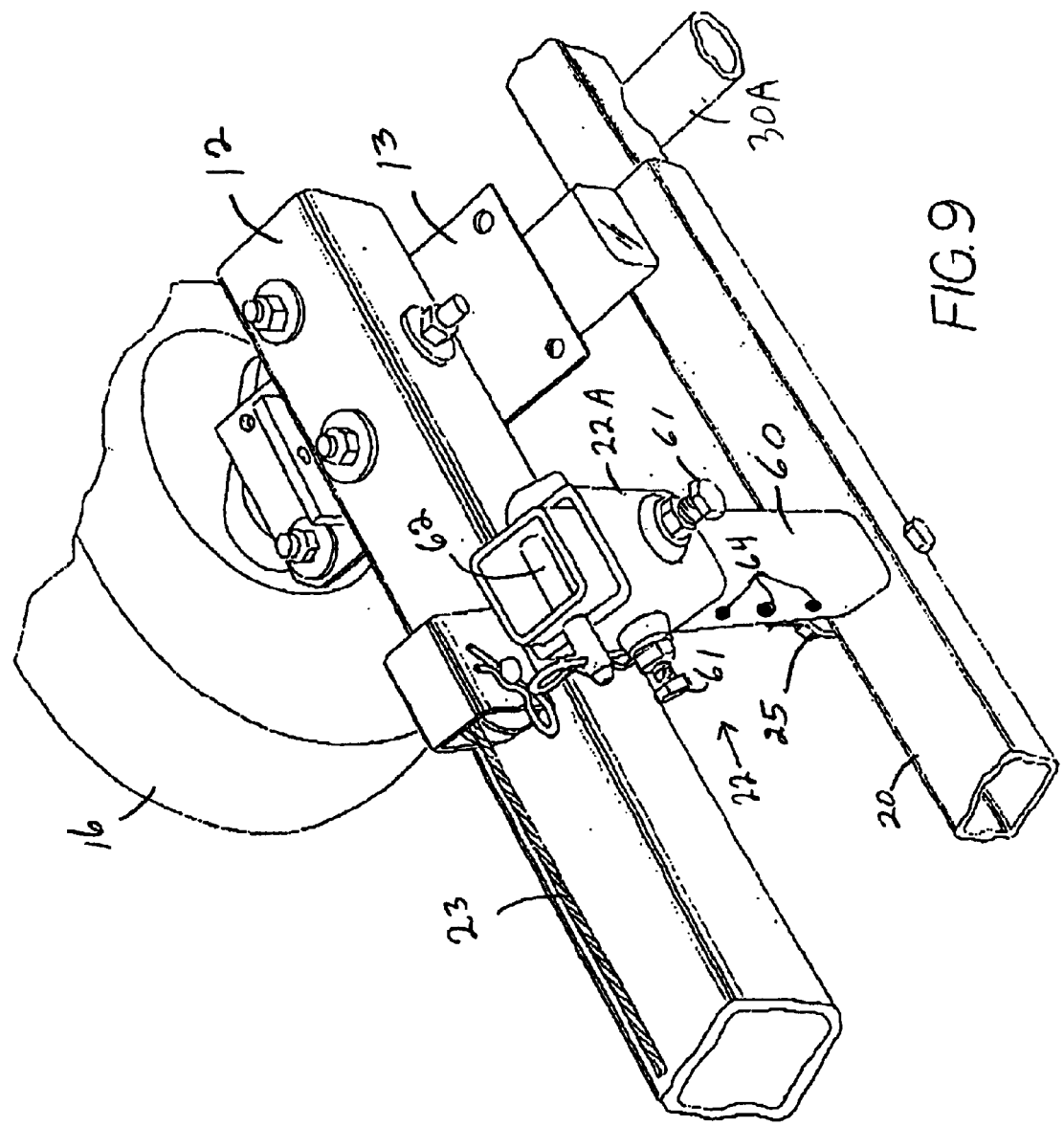
FIG. 9 is view along line 9—9 of FIG. 1.

FIGS. 2, 7, and 9 show one of the track assemblies 22 in more detail. A square cross-section post 60 is fixed to the movable carrier frame 20 and slides up and down inside the corresponding square cross-section track 22A, which is fixed to the main trailer frame 12. A pin 62 extends through an opening in the track 22A and through one of the openings 64 (See FIG. 2) in the post 60 to lock the post 60 in a fixed position relative to the track 22A.

Figure 3:
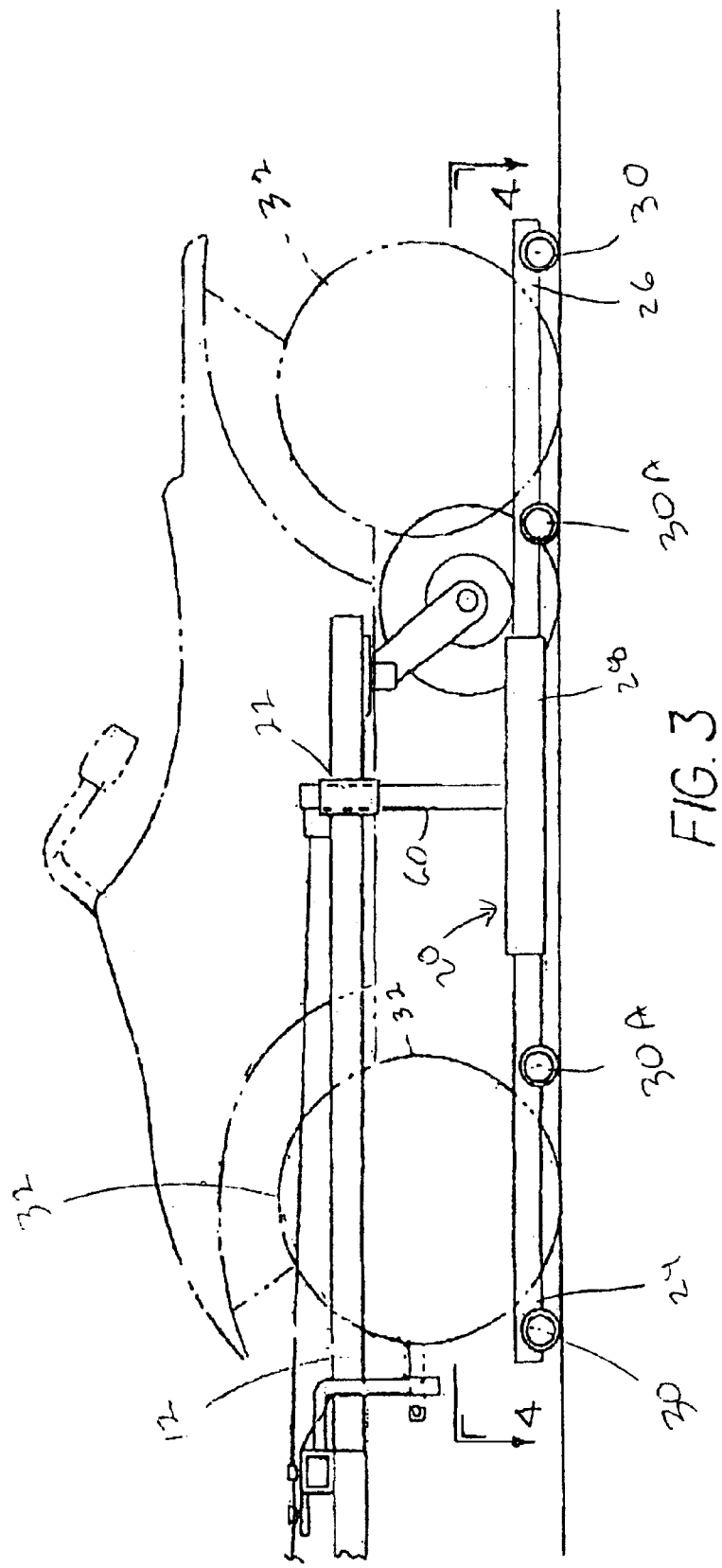
FIG. 3 is a view along line 3—3 of FIG. 1.

For loading and unloading a vehicle onto and off of the carrier 20, it is desirable to lower the carrier 20 close to the ground or all the way to the ground. FIGS. 1 and 3 show the carrier 20 resting on the ground. In this position, the vehicle is driven onto the carrier 20 (and into the trailer) from the open rear of the trailer, and the vehicle tires extend through openings in the carrier 20 to contact the ground.

Figure 5:
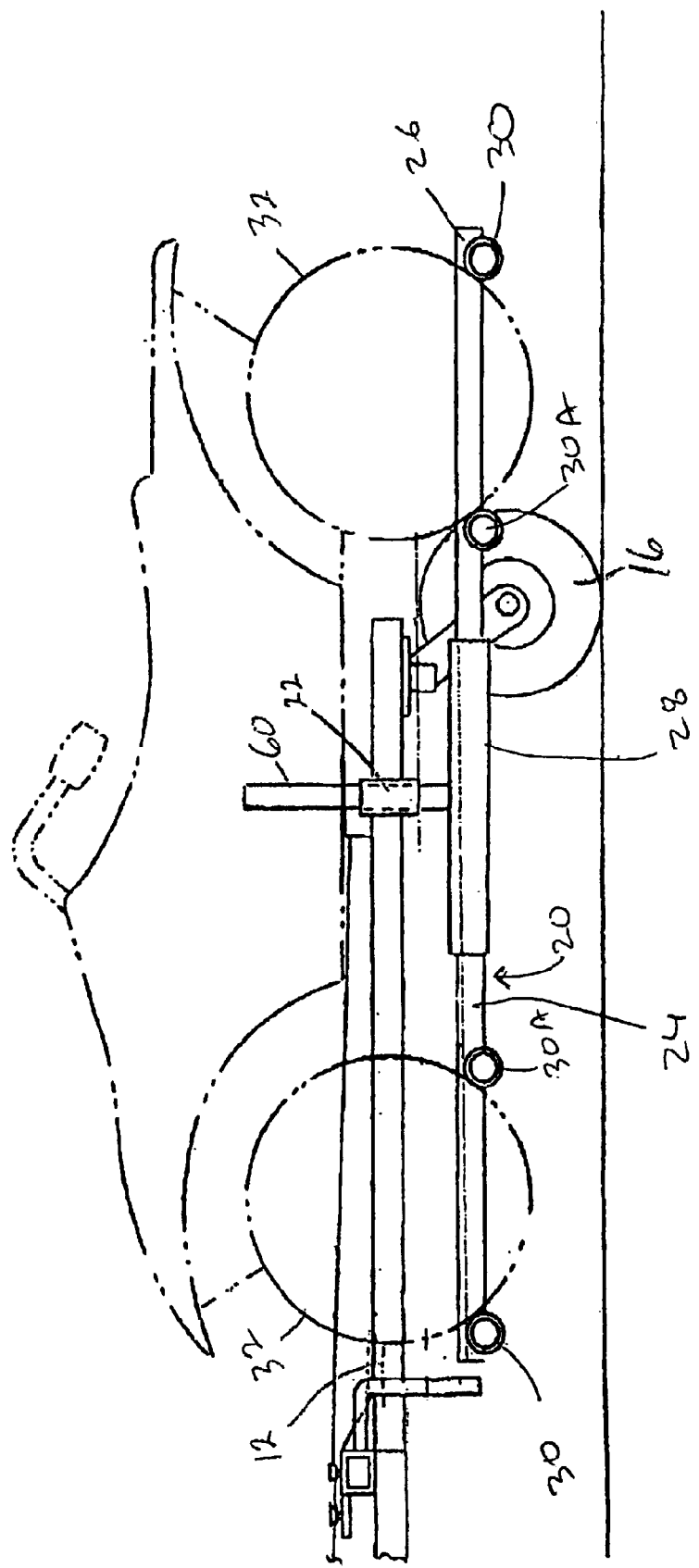
FIG. 5 is the same view as FIG. 3 but with the carrier in a raised position.

When the towed vehicle is driving the trailer 10, it may be desirable for the carrier 20 to be slightly off of the ground so it does not drag. (Alternatively, the carrier 20 may have casters or skids to permit it to "float" on the ground.) When the towed vehicle is being carried on the trailer 10, it is desirable to raise the carrier 20 up at least enough to lift the towed vehicle off of the ground (as shown in FIG. 5). These positions are selected by selecting the hole 64 on the post 60 through which the pin 62 is inserted. A stop of some kind, such as a fixed pin through the uppermost opening 64 of the post 60, may be used to prevent the movable frame or carrier 20 from falling entirely off of the trailer 10.

Figure 6:
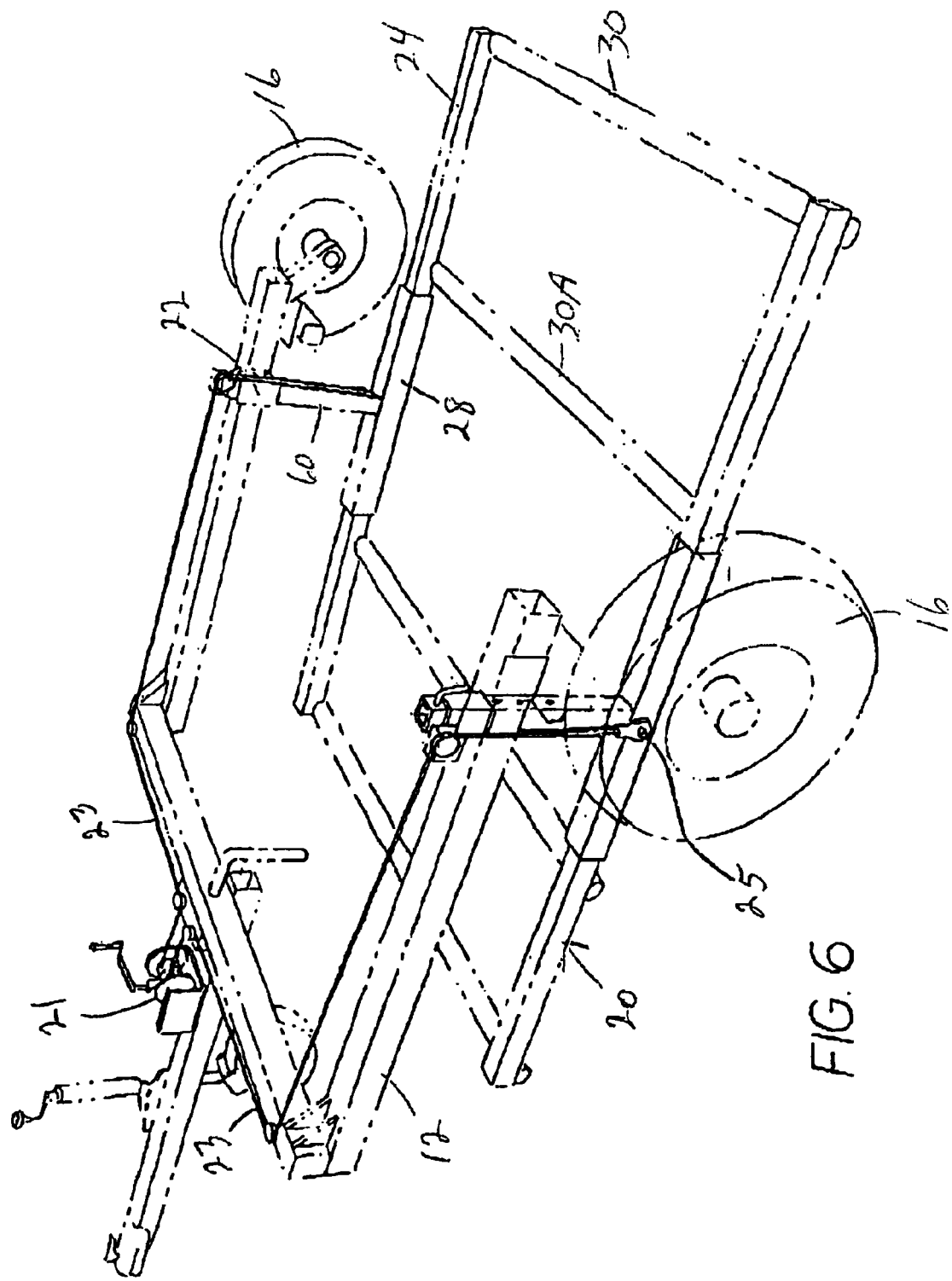
FIG. 6 is the same view as FIG. 1 but with most elements shown in phantom in order to highlight the mechanism for raising and lowering the carrier.
Figure 8:
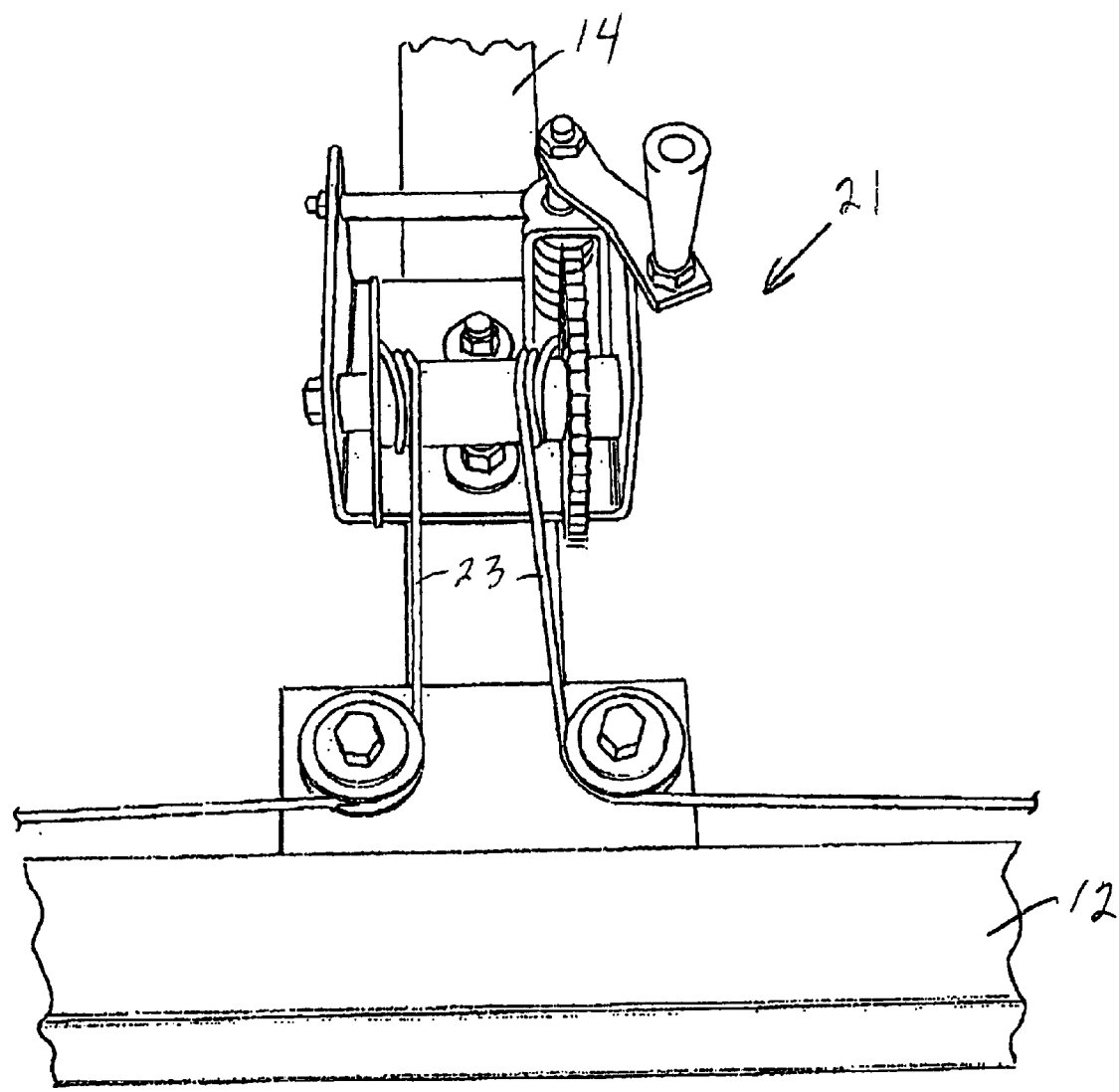
FIG. 8 is a view along line 8—8 of FIG. 1.

The carrier 20 is raised and lowered relative to the main frame 12 by a winch 21 and cables 23, shown best in FIGS. 6 and 8. The two cables 23 pass around pulleys and are secured to the carrier 20 at points 25 on the left and right sides of the carrier 20. The winch 21 has a hand crank, but it could also be operated by an electric motor. Various other types of jacking or lifting mechanisms could be used instead of or in addition to the winch and cable arrangement shown here. For example, a hydraulic jack, a screw lift, a scissors jack, a ramp, or other types of jacks could be used. Also, the motive force for lifting the vehicle may be provided by a device on the trailer 10, such as the winch 21, or it may be provided by the vehicle itself, as will be shown in later embodiments. Also, while in this particular embodiment the carrier frame 20 and the main trailer frame 12 are connected together by a track 22, other types of connections, such as the scissors-type connection in U.S. Pat. No. 5,536,1312 "Behr" or U.S. Pat. No. 5,810,544 "Wellman" or other types of connections could be used.

Figure 4:
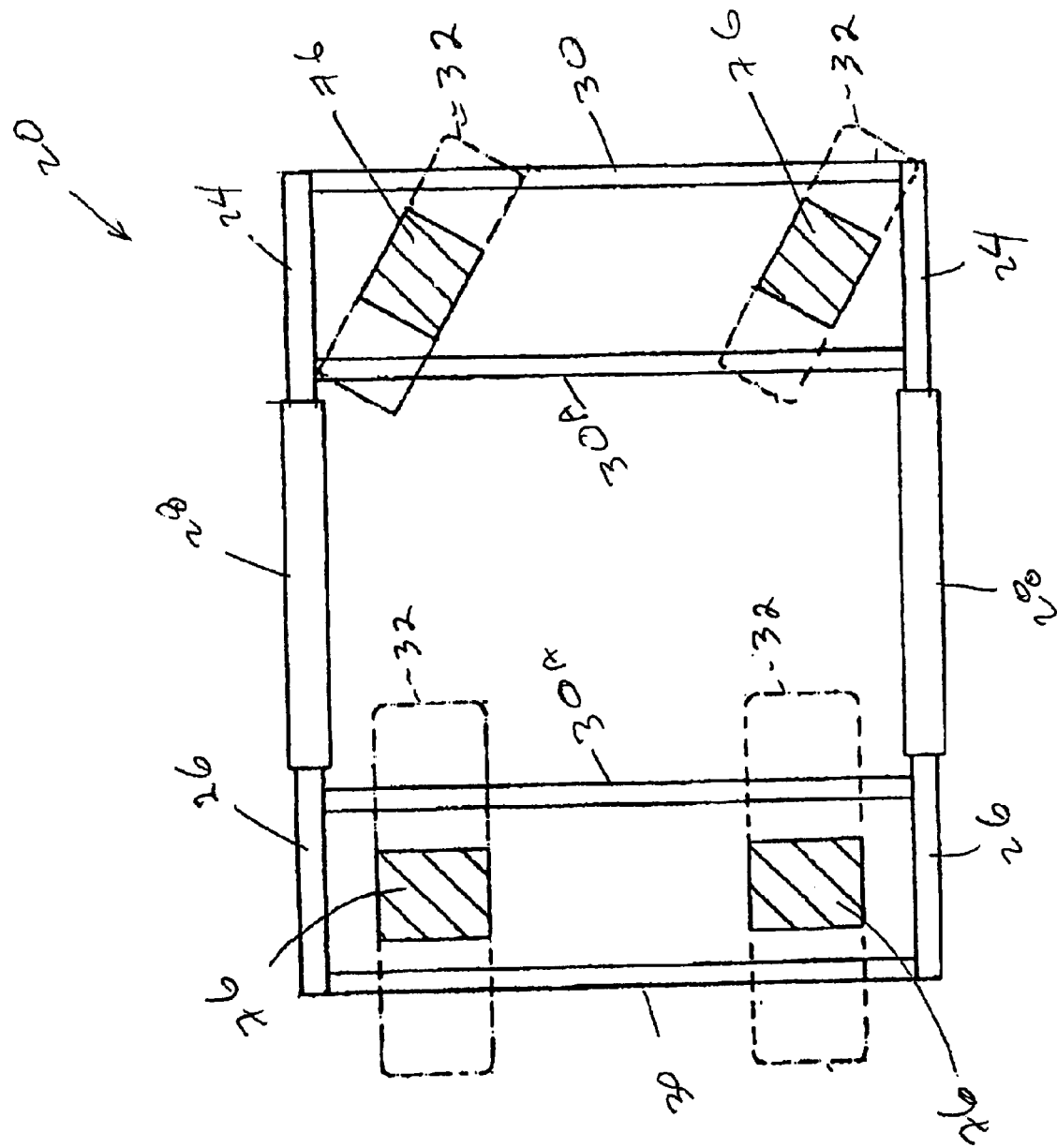
FIG. 4 is a view along line 4—4 of FIG. 3, but with the steered wheels of the towed vehicle shown in a turned position.

FIGS. 4 and 7 show the movable frame or carrier 20, which is substantially rectangular in shape and includes a forward frame portion 24 and a rear frame portion 26 connected together by telescoping intermediate connector portions 28. Each of the frame portions 24, 26 includes two parallel, spaced-apart beams 30, 30A, extending in a left-to-right direction and defining an opening between the beams 30, 30A through which the wheels (or driving feet) of the vehicle can extend. The forward and rear frame portions 24, 26 telescope inside of the connector portions 28, and their positions relative to the connector portions 28 are defined by aligning holes in the desired position and inserting a pin 31 through the aligned holes (as best illustrated in FIG. 7). It would also be possible to make the beams 30, 30A and the main frame 12 telescope in a similar manner, in order to adjust the width of the trailer, if desired. In this embodiment, the telescoping portions are made of square cross-section material which is sized so that the forward and rear frame portions 24, 26 can slide inside the intermediate connectors 28. The beams 30 are positioned so as to place the center of gravity of the vehicle and trailer in the desired position, usually over the wheels.

The spacing between the outer and inner beams 30, 30A is also adjustable to accommodate smaller or larger diameter tires. FIG. 7 shows one adjustment mechanism that may be used to adjust the distance between a pair of beams 30, 30A. In this case, a notch 66 at both ends of the beams 30, 30A allows the beams 30, 30A to mate up against the forward and rear frame portions 24, 26 of the carrying frame 20. Holes 68 through the notched section 66 align with one of a plurality of spaced apart holes 70 on the corresponding frame portions 24, 26 and a bolt 72 and nut 74 secure the beams 30, 30A to the frame portions 24, 26. While the use of pins is one simple adjustment mechanism, a wide variety of adjustment mechanisms, including those which provide infinite adjustment, could be used, including a sliding mechanism that is clamped in position, a screw adjustment, or other known types of adjustment mechanisms.

Typically, for proper adjustment of the beams 30, 30A, the outer beams 30 are secured to the outer ends of the frame portions 24, 26 respectively. The frame portions 24, 26 are then adjusted by sliding them telescopically along the intermediate connector members 28 until the outer beams 30 are adjacent to, but not in contact with, the tires of the towed vehicle when the carrying frame is in the lowered position, either resting on or close to the ground as shown in FIG. 3. The inner beams 30A are then adjusted so that they in turn also are adjacent to, but not in contact with, the tires of the towed vehicle, and on the other side of the tires from which the beams 30 are located (again, refer to FIG. 3).

As shown in FIGS. 3 and 4, when the carrying frame 20 is in the lowered position (either contacting the ground or lifted slightly off of the ground) and the tires of the towed vehicle are in contact with the ground, the beams 30, 30A are out of contact with the tires of the towed vehicle, and the tires are able to contact the ground to drive the vehicle. There is enough space in the opening between the beams 30, 30A to permit the wheels of the towed vehicle to be steered, as shown in FIG. 4.

When the carrying frame 20 is raised as shown in FIG. 5, the beams 30, 30A provide lift points which contact the tires of the towed vehicle and raise and support the towed vehicle. The front-to-back length of the opening between the beams 30, 30A is less than the diameter of the tires in order to ensure that the beams 30, 30A will contact the tires in order to lift the towed vehicle.

FIG. 4 illustrates the relative positions of the beams 30, 30A relative to the tires of the towed vehicle when the carrier frame 20 is in the lowered position (either resting on, or slightly raised off of the ground). The solid, cross-hatched areas 76 represent the tires' footprint on the ground. The beams 30, 30A are spaced apart and away from these areas 76, allowing the vehicle to be driven and steered while taking the carrier 20 and main frame 12 along with it, as is explained in more detail later.

When the carrier frame 20 is raised, as in FIGS. 2 and 5, the beams 30, 30A provide lifting surfaces or lift points, which contact the vehicle's tires 32 and lift the vehicle. As the carrying frame is lowered toward the ground, the tires 32, which project through the openings between the pairs of beams 30, 30A, come into contact with the ground. As the carrying frame is lowered a bit further toward the ground, after the tires 32 have contacted the ground, the beams 30 become spaced a distance away from the tires 32, as shown in FIGS. 1, 3, and 4. This leaves the tires 32 free to drive and turn as if the carrying frame 20 were not present. If the vehicle is secured to the trailer in some manner while it is in this lowered position, it can then drive and steer the trailer 10.

FIG. 9 is an enlarged view showing how the trailer wheels 16 are connected to the main frame 12 by means of a bracket 13 bolted to the main frame 12. Other means of connecting the wheels to the main frame which could alternatively be used are taught in other references, such as U.S. Pat. No. U.S. Pat. No. 2,487,508 "Anderson", U.S. Pat. No. 5,536, 131 "Behr", U.S. Pat. No. 5,810,544 "Wellman", U.S. Pat. No. 4,700,798 "Johansson", or U.S. Pat. No. 4,998,594 "Orloski", which are hereby incorporated by reference. This view also shows one of the cables 23 secured to the carrier 20 by a bolt at the point 25, and it shows the track 22A and the post 60 that slides vertically inside the track 22A. There are adjustment bolts 61, threaded into the side walls of the track 22A that can be adjusted in or out to help control the tracking of the post 60 within the track 22A.

Figure 10:
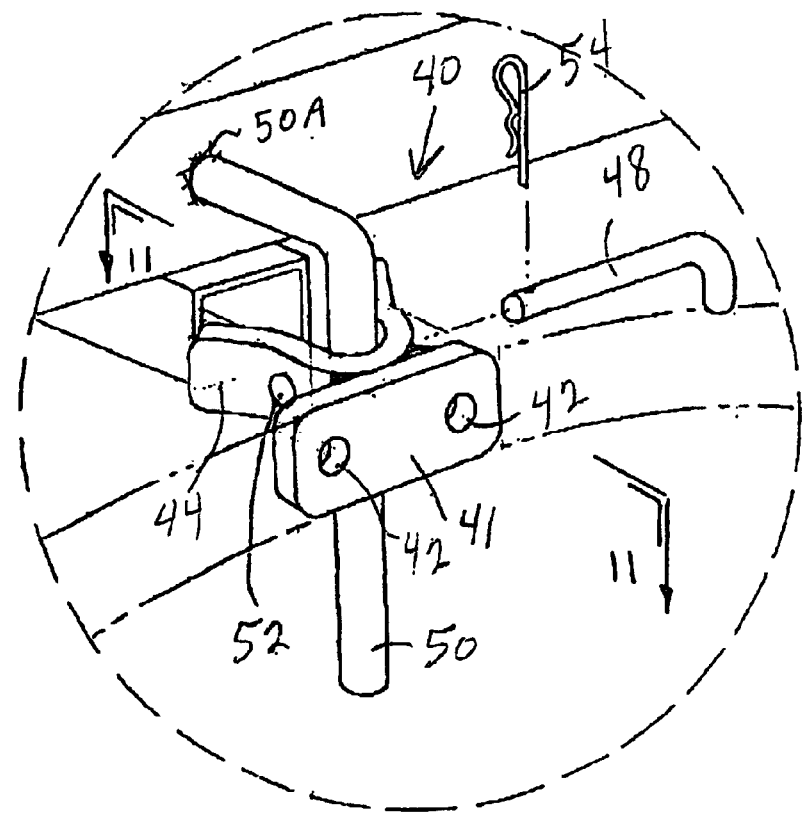
FIG. 10 is an enlarged view of the mechanism for coupling or securing a towed vehicle to the trailer of FIG. 1.
Figure 11:
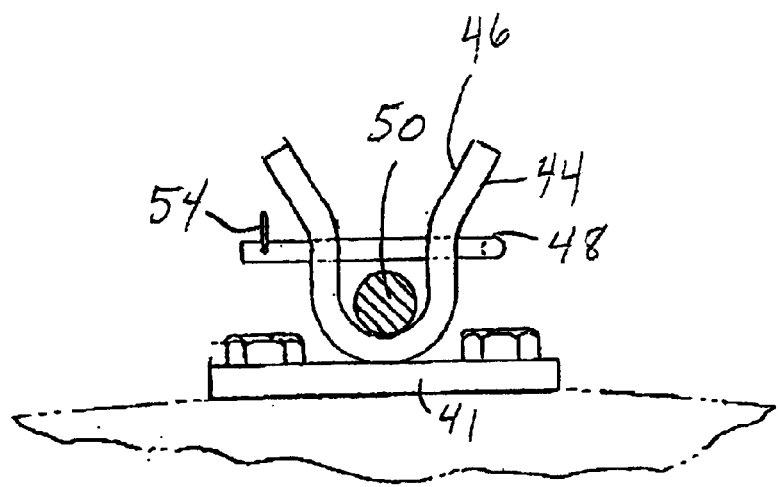
FIG. 11 is a view along line 11—11 of FIG. 10.

FIGS. 10 and 11 show an example of a mounting arrangement 40 that can be used to secure the towed vehicle to the trailer 10. The mounting arrangement 40 includes a bracket 41 secured to the towed vehicle and a post 50 secured to the trailer at the point 50A. The bracket 41 is mounted onto the vehicle by inserting bolts or other fasteners through the holes 42 in the bracket and through the bumper or other portion of the vehicle. The bracket 41 includes a yoke 44, which projects forward from the vehicle. The vertical post 50 is received in the opening 46 defined by the yoke 44, and a pin 48 is inserted through holes 52 in the yoke 44 and locked in position by means of another pin 54. This secures the towed vehicle to the trailer, so that, as the vehicle drives, it carries the trailer along with it.

If the post 50 is mounted on the main frame 12 of the trailer, as it is in this embodiment, the yoke 44 can move up and down relative to the post 50 as the carrying frame 20 is raised and lowered. The post 50 could alternatively be mounted on the movable frame 20, in which case there would be less relative vertical movement between the post 50 and the yoke 44. Also, the post 50 could be mounted on a member that slides horizontally in the forward-to-rear direction (not shown), in order to facilitate shifting the position of the vehicle to place the center of gravity of the vehicle in the desired location. And, while the post 50 in this embodiment has a circular cross-section, which permits the trailer to pivot about the axis of the post 50 relative to the vehicle, it may be desirable to make the post 50 have a non-circular cross-section which mates with a non-circular cross-section opening in the yoke to prevent pivoting of the trailer relative to the vehicle. The effect would be similar to the track 20 which mounts the carrier frame 20 and the main frame 12 together. Or it may be desirable to have two sets of the mounting mechanisms 40, for example one at each of the front corners of the vehicle, which again would prevent pivoting of the vehicle relative to the trailer. Of course, many alternative mechanisms for securing the towed vehicle to the trailer could also be used. For example, the towed vehicle could simply be tied to the carrier frame 20 with straps.

A typical way in which this trailer 10 could be used is as follows:

The carrier or movable frame 20 is lowered to or near the ground, and the vehicle to be carried is driven into the interior of the U-shaped main frame 12 and onto the carrier 20, so that the vehicle is inside the trailer. The towed vehicle is then secured to the trailer using the mounting arrangement 40 including the bracket 41, the post 50, and the pin 48. The winch is then used to raise the carrying frame 20 slightly off of the ground (or the carrying frame remains slightly off of the ground), but not enough to contact the vehicle's tires, and the towed vehicle can then be driven, pulling the trailer 10 along with it, for example to bring the trailer 10 into alignment with a towing vehicle. The trailer 10 may then be hitched to the towing vehicle using the hitch or coupler 14A at the free end of the tongue 14. The carrier 20 may then be raised by using the winch 21. As the carrier 20 is raised, its lift points contact the towed vehicle's tires and lift the towed vehicle to a raised position, in which the tires are off of the ground, and the towing vehicle may then pull the trailer and the towed vehicle to the desired destination.

Upon arrival at the destination, the carrier 20 can be lowered to a position slightly above the ground, allowing the towed vehicle's tires to rest on the ground. The trailer 10 can then be unhitched from the towing vehicle, and the towed vehicle can be driven, pulling the trailer along with it, to any desired place, for example a garage or a parking space. It may be particularly desirable to drive the trailer tongue-first into a garage, and to park it there, because it would be nearly impossible for anyone to hitch to the trailer in that position to steal the trailer or anything on it. The carrier 20 may then be lowered to the ground, and the mounting arrangement 40 may then be released, allowing the towed vehicle to be driven off of the carrier 20 to be used.

FIGS. 12–14 show an alternative embodiment of a trailer 110, in which the carrier or movable frame 120 is fixed to a track 122, which is adjustable in height relative to the stub axles 118. The stub axles 118 in this embodiment function as the main frame of the trailer. The track 122 defines holes, and the stub axles 118 define holes which receive pins 122A to fix the height of the movable frame 120 relative to the fixed frame 118. As in the first embodiment, the beams 130 are adjustable in position in order to accommodate various lengths of vehicles and various sizes of tires on the towed vehicle. Of course, if the trailer 110 is made for carrying just one specific vehicle, these adjustments would not be necessary. The mechanism for raising and lowering the carrier 120 is not shown, but a winch could be mounted on the towing tongue 114, and cables could terminate at the stub axles 118 for raising and lowering the carrier 120 relative to the stub axles 118, in a manner similar to that shown in the first embodiment. Of course, various other known lifting or jacking arrangements could alternatively be used. In this embodiment, when the vehicle drives onto the carrier frame 120 it is inside the trailer and can drive the trailer from that position.

Figure 15:
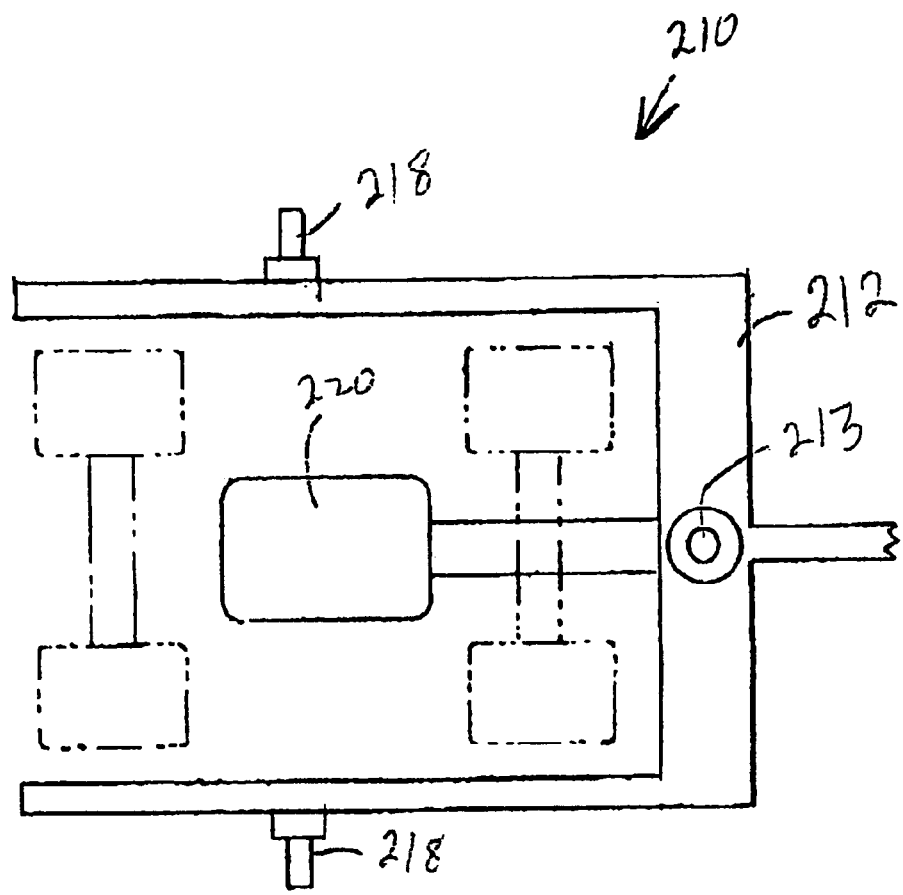
FIG. 15 is a partially broken away plan view of another alternate embodiment of a trailer made in accordance with the present invention, including a schematic representation of the vehicle being carried by the trailer.
Figure 16:
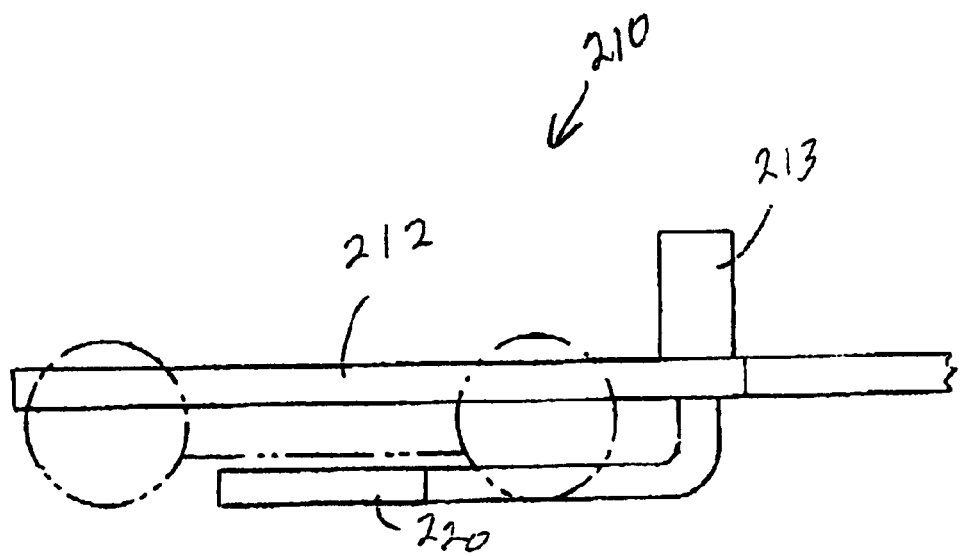
FIG. 16 is a side view of the trailer of FIG. 15.

FIGS. 15 and 16 show another alternative embodiment of the invention. In this embodiment, the main frame 212 of the trailer 210 is mounted on stub axles 218. A cantilevered carrier 220 is mounted onto the main frame 212 and may be raised and lowered relative to the main frame 212 by a hydraulic cylinder 213 or an electric motor in a manner similar to raising and lowering the fork on a forklift truck. The carrier 220 in this embodiment has a top lift surface which has lift points that contact the underside of the frame of the vehicle, and the space between the carrier 220 and the U-shaped main frame 212 defines an opening through which the tires, tracks, or other types of moving feet of the vehicle extend in order to contact the ground and drive the vehicle when the carrier 220 is lowered.

Figure 17:
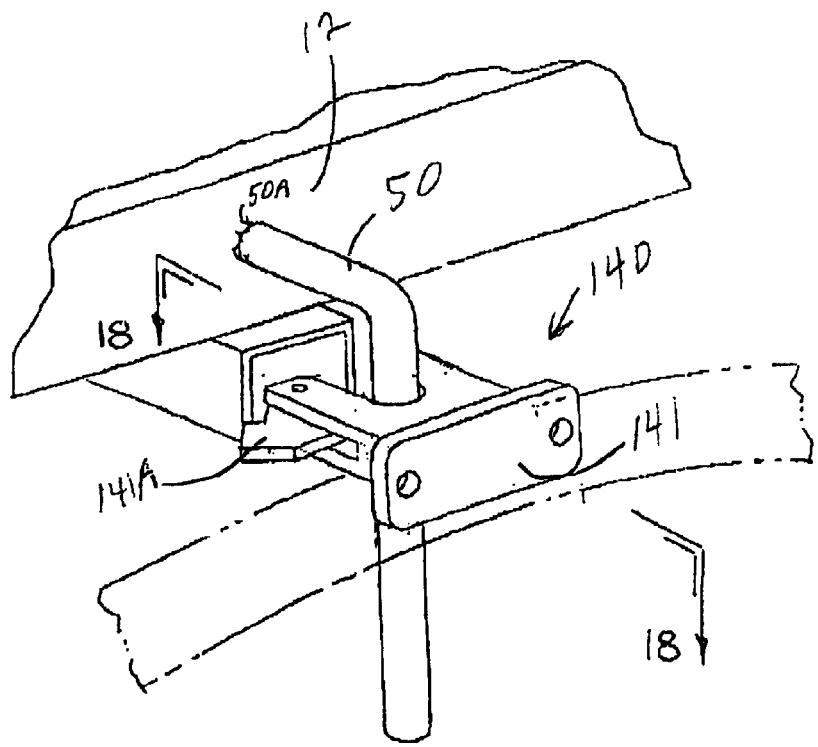
FIG. 17 is a perspective view of an alternate embodiment of a latching mechanism for coupling or securing the towed vehicle to the trailer frame.
Figure 18:
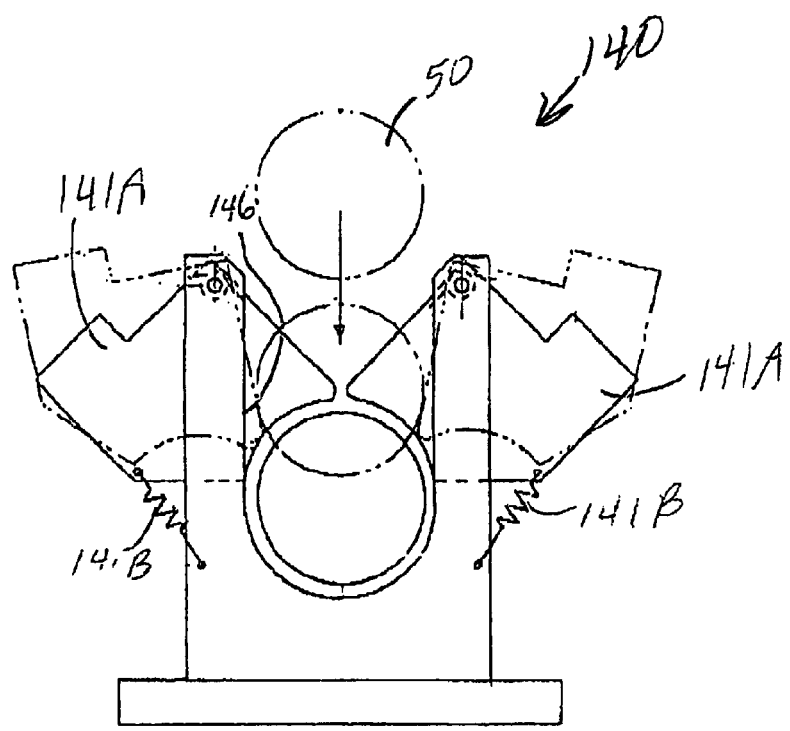
FIG. 18 is a view along line 18—18 of FIG. 17.

FIGS. 17 and 18 show an alternative mounting mechanism 140 for securing the towed vehicle to the trailer while the towed vehicle is inside the trailer in order to enable the towed vehicle to drive the trailer. In this case, a bracket 141 is bolted to the towed vehicle, and a post 50 is fixed to the main frame 12 at the point 50A. The bracket 141 includes spring-loaded pivot arms 141A. When the towed vehicle drives into the trailer 10, the post 50 automatically pushes the arms 141A to the position shown in phantom in FIG. 18 and enters into the yoke opening 146. Then, the springs 141B pull the arms back into position, locking the post 50 to the bracket 141, so that the vehicle can move vertically relative to the post 50 and can pivot about the post, but it will take the trailer 10 along with it as it drives along the ground. Again, it may be desirable to make the post and bracket non-circular in cross-section to prevent pivoting, and it may be desirable to mount the post on a member that is adjustable in the forward-to-rear direction in order to be able to adjust the position of the center of gravity of the vehicle.

Figure 19:
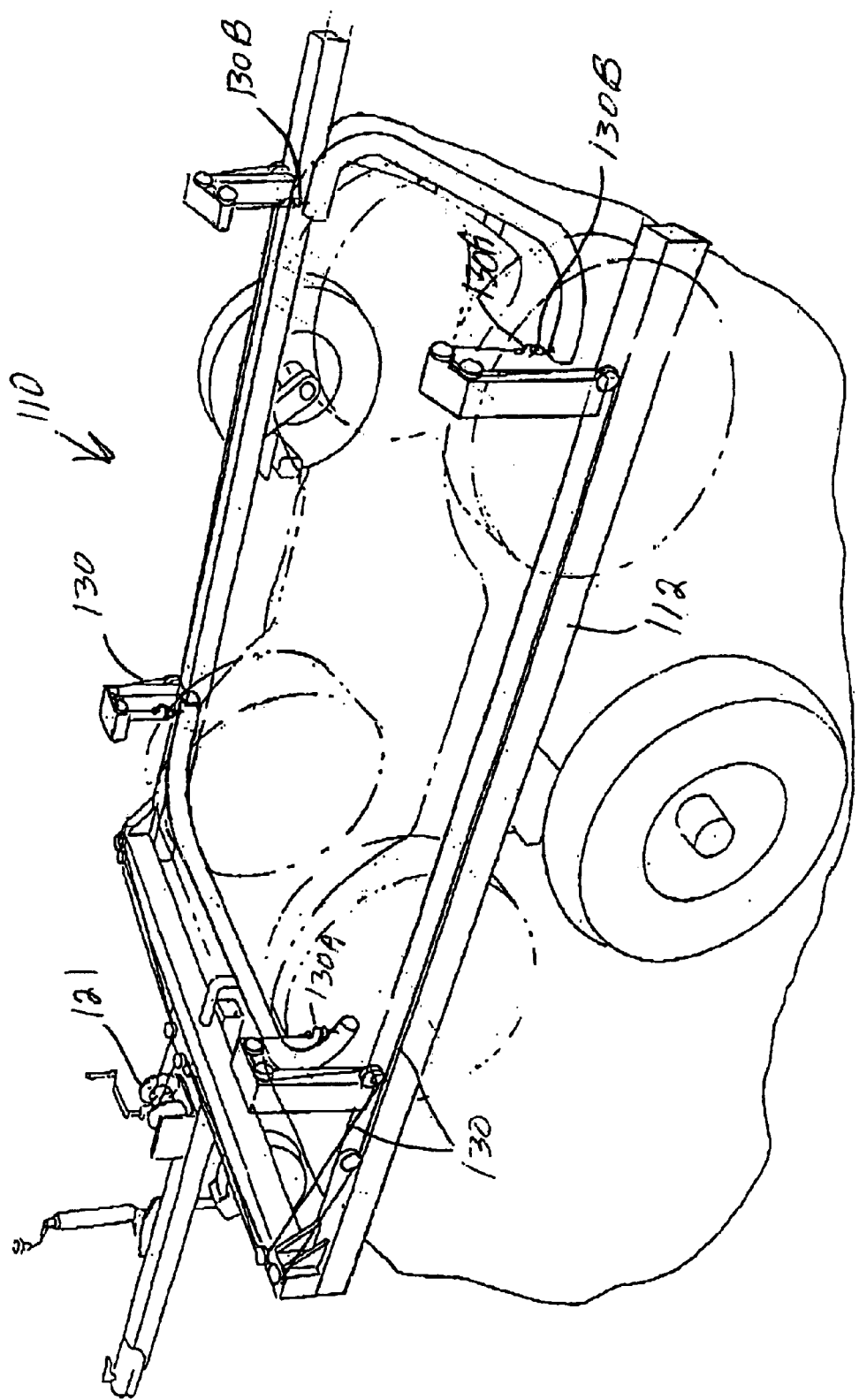
FIG. 19 is a perspective view of another alternative embodiment of a trailer made in accordance with the present invention, with the carrier lifting the vehicle at lift points on the vehicle's frame.

FIG. 19 shows another alternative embodiment of a trailer made in accordance with the present invention. This embodiment is similar to the embodiment of FIG. 1, except that the movable carrier is not rigid and is, instead, made up of cables 130 and hooks 130A, which hook into eyes 130B on the vehicle. The vehicle to be towed may be driven into the open U-shaped main frame 112 of the trailer 110, and may be latched or secured to the trailer 110 as in the first embodiment, in order to drive the trailer around to a desired position. The cables 130 may be hooked into the vehicle to be towed, and the winch 121 may be operated to lift the vehicle off of the ground for towing. This trailer design makes it easy to adjust the positions of the carrier to fit the vehicle, simply by moving the cables to the desired position to hook into the eyes 130B on the vehicle. While this embodiment has the winch 121 mounted on the main frame 112 of the trailer 110, it should also be understood that the winch 121 or other lifting mechanism could alternatively be mounted on the towed vehicle.

Figure 20:
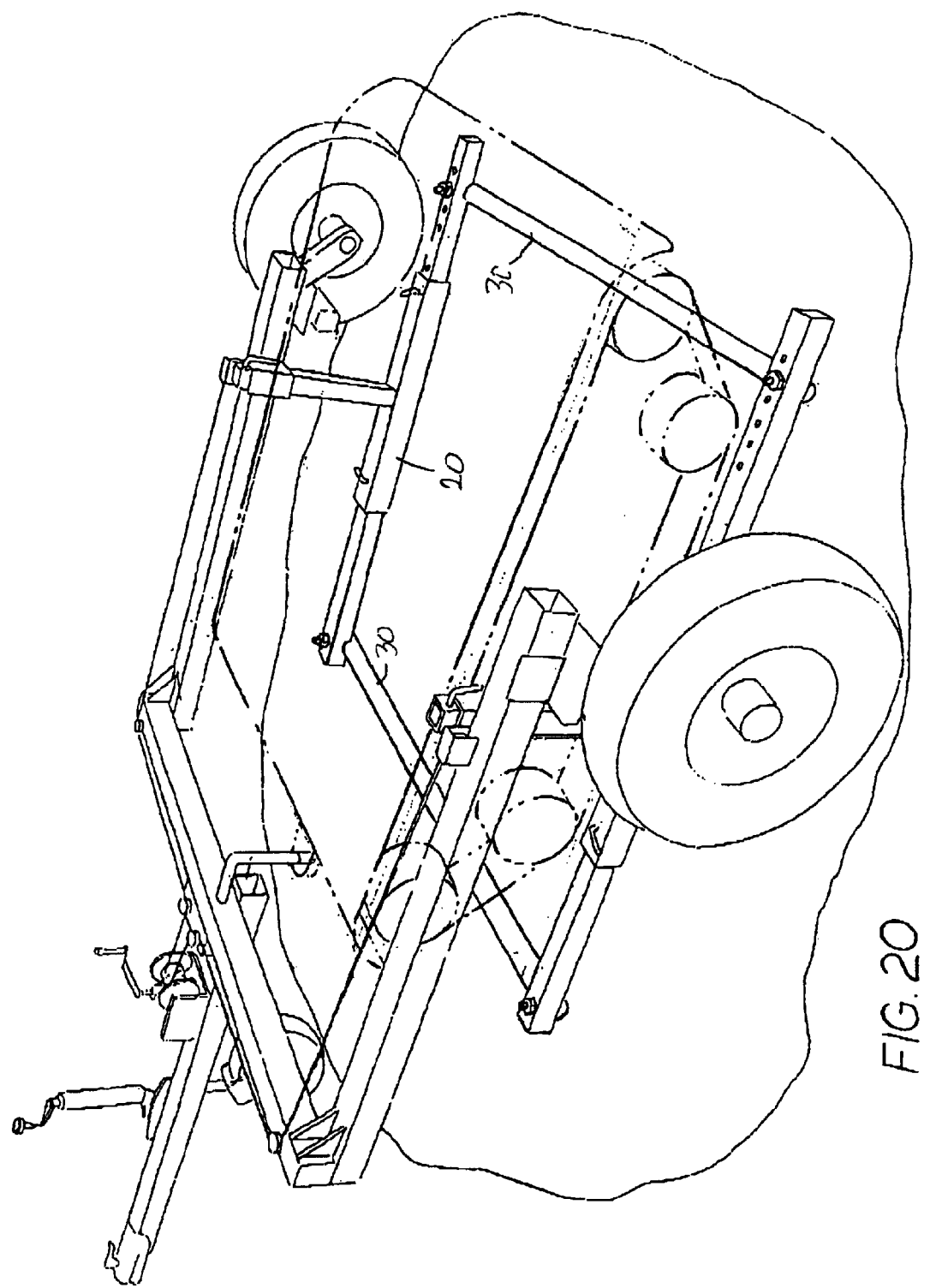
FIG. 20 is a perspective view of another alternative embodiment of a trailer made in accordance with the present invention, for use with a tracked vehicle.

FIG. 20 is a schematic of another embodiment of a trailer made in accordance with the present invention. This embodiment is the same as the first embodiment, except that the inner beams 30A are not present. This embodiment is intended to carry a tracked vehicle, with the tracks being the driving feet that propel the vehicle along the ground. Since the tracks extend a greater longitudinal distance than do the tires of vehicles shown in previous embodiments, the opening defined by the beams 30 is longer than in previous embodiments. As with previous embodiments, when the carrier is lowered, the driving feet of the towed vehicle contact the ground and come out of contact with the beams 30, so they can be used to drive the vehicle and trailer. When the carrier is raised, lift points on the beams 30 contact the tracks or driving feet, lifting the vehicle off of the ground for towing.

Figure 21:
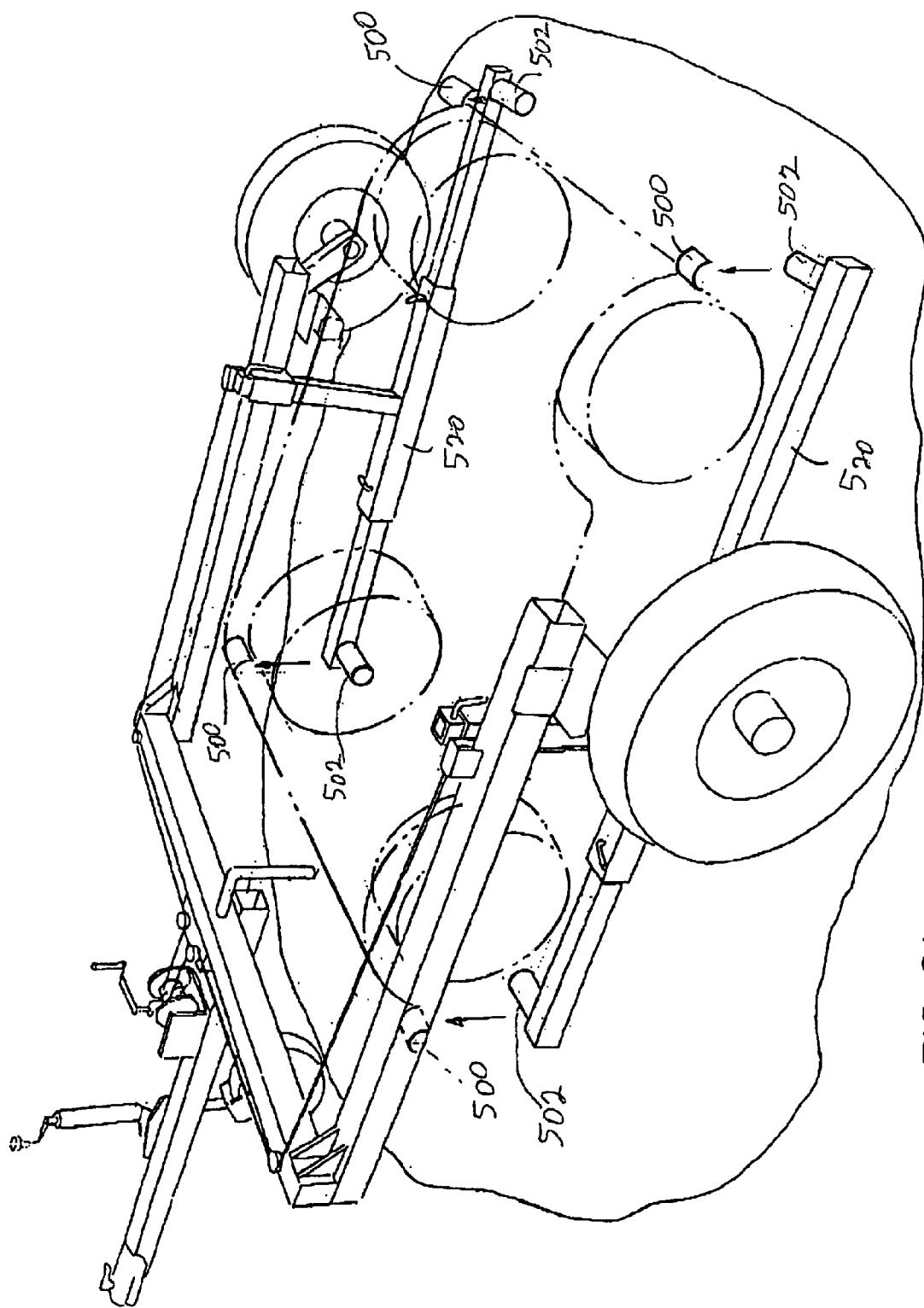
FIG. 21 is a perspective view of another alternative embodiment of a trailer made in accordance with the present invention, which lifts the vehicle at lift points on the vehicle frame.

FIG. 21 is a schematic of another embodiment of a trailer made in accordance with the present invention. This design is the same as the design of FIG. 1, except that the beams 30, 30A are eliminated and are replaced by projections 502, which provide the lift points. In this case, the vehicle has arcuate-shaped receivers 500 mounted onto its frame, and the carrier 520 has cylindrically-shaped projections 502, which mate with those receivers 500 to raise and lower the towed vehicle.

FIGS. 22–26 show another embodiment of a trailer 610, intended for use with a vehicle that has its own lifting mechanism in the form of movable pivot arms 602, which carry a bucket 604 or other implement or tool. In most vehicles having movable arms, there is a hydraulic actuator or lifting mechanism that raises and lowers the arms relative to the vehicle. In this embodiment, the main frame 612 of the trailer supports a platform 606 and a lip 608, which function as a receptacle to receive the bucket 604, as will be described below. The main frame 612 also has four wheel mounts 611, shown in more detail in FIG. 26, for mounting to the hubs 613 of the vehicle.

In this embodiment, the vehicle drives into the open rear of the U-shaped main frame 612, with the arms 602 in the position shown in FIG. 23, so that the bucket 604 rests on the platform 606 and is caught under the lip 608. The wheel mounts 611 are then slid along the frame 612 and are locked in place on the frame 612. The mounts 611 then are adjusted up and down and in and out as needed to insert their projections 613A into the receptacles 613 on the centers of the vehicle wheel hubs. At that point, the vehicle is secured to the main frame 612 by means of the wheel mounts 611. The U-shaped opening in the main frame of the trailer provides the space for the vehicle tires to contact the ground. In this position, the vehicle can be driven around along the ground and will take the trailer 610 along with it.

Figure 24:
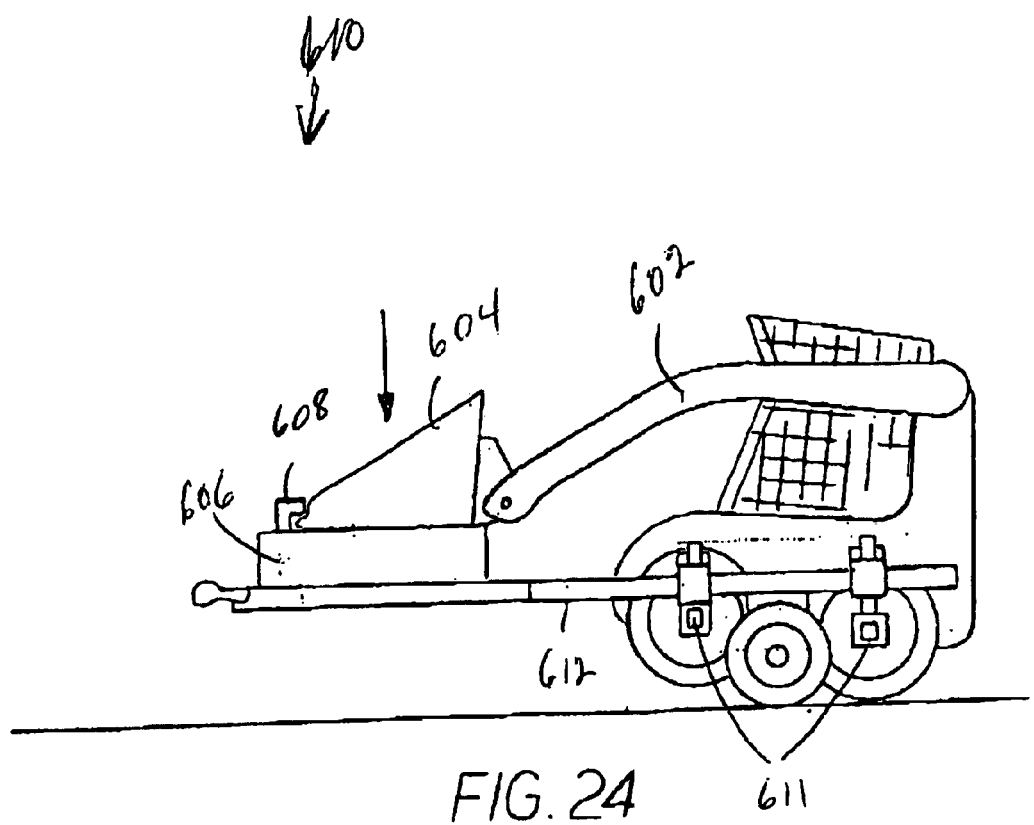
FIG. 24 is the same view as FIG. 23 but with the front of the vehicle lifted up off of the ground.
Figure 25:
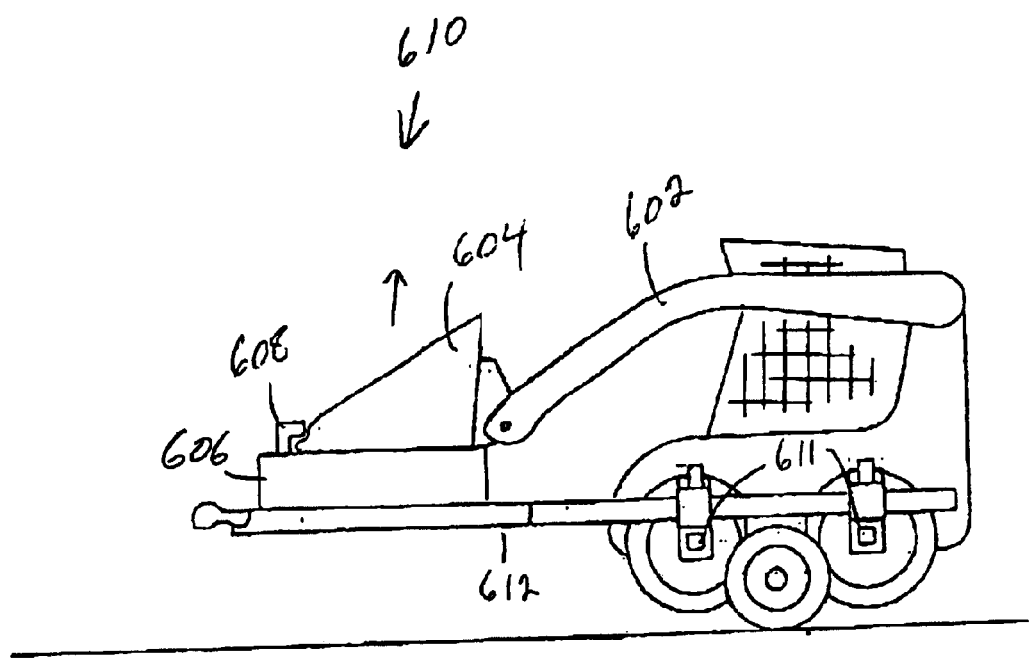
FIG. 25 is the same view as FIG. 24 but with the entire vehicle lifted up off of the ground.
Figure 26:
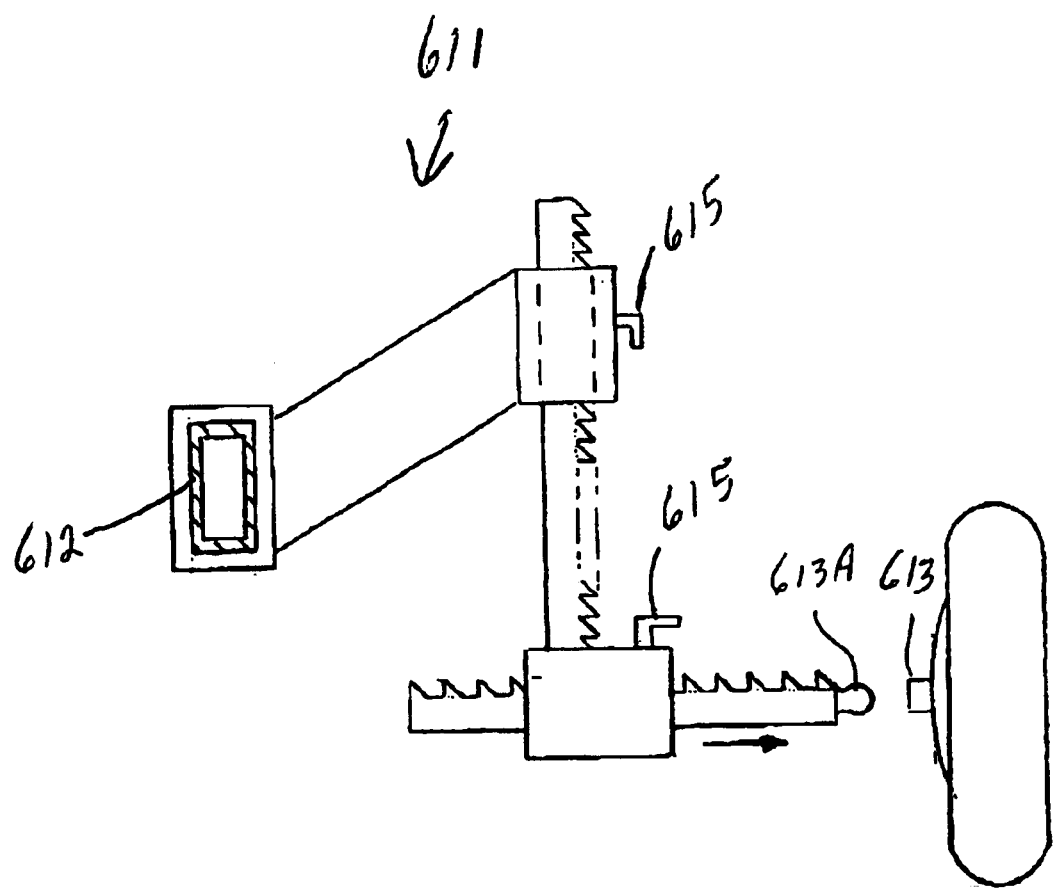
FIG. 26 is a view taken along the line 26—26 of FIG. 23, showing a coupling mechanism for securing the vehicle to the trailer.
Figure 27:
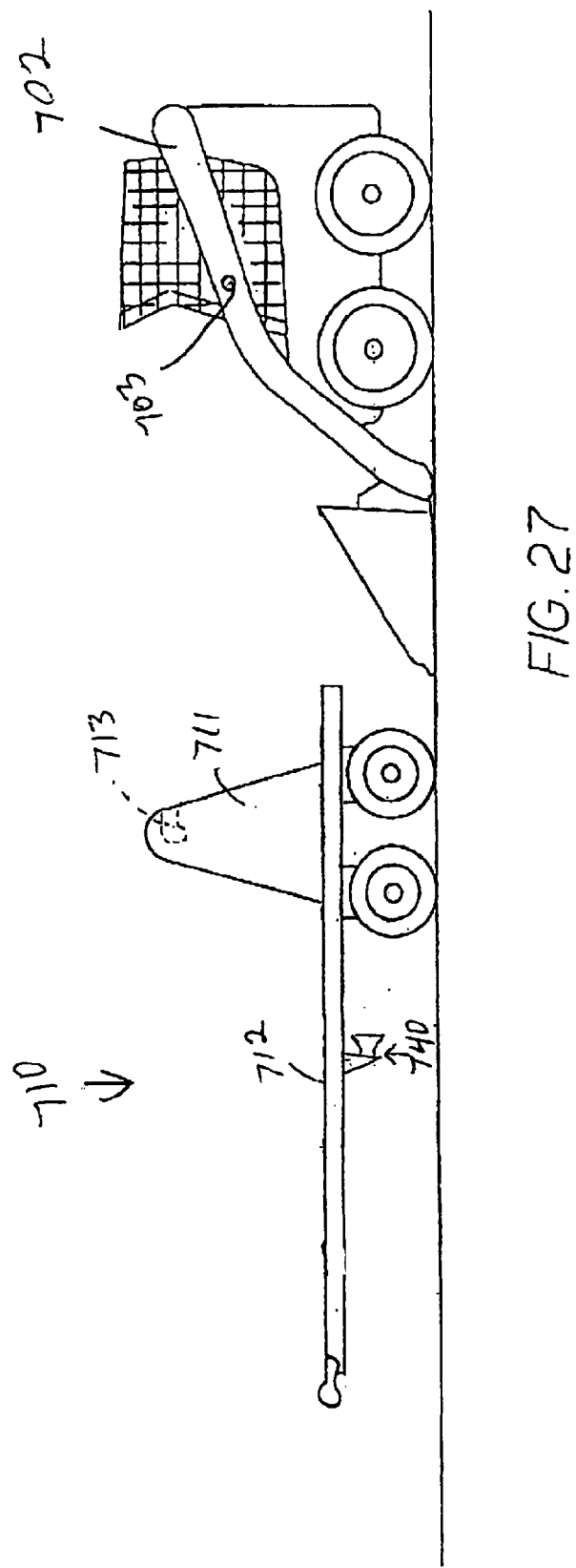
FIG. 27 is a side view of another embodiment of a trailer and vehicle, also for use with a vehicle having movable arms.

In order to lift up the vehicle to be carried by the trailer 610, the vehicle's arms 602 serve as the lifting mechanism, which jacks up the vehicle relative to the main frame 612. First, the bucket 604 pushes down on the platform 606, lifting up the front wheels of the vehicle, as shown in FIG. 24. The vertical ratchet mechanism on the front wheel mounts 611 ratchets up accordingly, holding the front wheels of the vehicle in the raised position. Then, the bucket 604 lifts up, pushing against the lip 608, causing the vehicle to pivot about its raised front wheels, thereby raising the rear wheels, as shown in FIG. 25. Again, the vertical ratchet mechanism on the rear wheel mounts 611 ratchets up accordingly, holding the rear wheels in the raised position. Now, the vehicle is securely held in the raised position by the wheel mounts 611. The wheel mounts 611 include releases 615, which allow the ratchet mechanisms to be released in order for the arms 602 to lower the vehicle back to the ground and to remove the wheel mounts 611 from the vehicle hubs 613. In this embodiment, the wheel mounts 611 serve as the carrier or movable frame as well as serving as the mounting mechanism for securing the vehicle to the trailer, and the lift mechanism includes the hydraulics or other mechanisms on the vehicle which drive the arms 602 up and down relative to the main portion of the vehicle.

FIGS. 27-30 show another trailer 710, which is used with a vehicle that has movable pivot arms 702 for raising and lowering a bucket or other implement. The raising and lowering mechanism for the movable arms 702 of the vehicle is used to raise and lower the vehicle relative to the trailer. In this embodiment, ball-shaped projections 703 have been welded to the outside of the vehicle arms 702. The trailer 710 includes left and right upwardly-projecting side walls 711, centered over the trailer wheels. Each of the side walls 711 defines a rearwardly-opening slot 713 that serves as a receptacle, receiving a projection 703 from its respective arm. While the side walls 711 in this embodiment are fixed in position on the main frame of the trailer, it may be desirable to mount them so they can be moved along the frame to adjust the center of gravity of the towed vehicle relative to the trailer. The slots 713 are tapered, trapping the respective ball projection 713 so that the ball projection 713 can only come out of the slot 713 through the rear opening through which it entered. The slots 713 also extend downwardly from the entry point to the innermost point, so that, once the ball projection is seated in the innermost point of the slot, it must travel from a lower elevation to a higher elevation in order for the ball projection 713 to be removed from its respective slot. When the weight of the vehicle is being supported by the ball projections, the weight prevents the ball projections from moving upwardly to exit the slots, thereby keeping the ball projections seated at the innermost portions of the slots.

Figure 28:
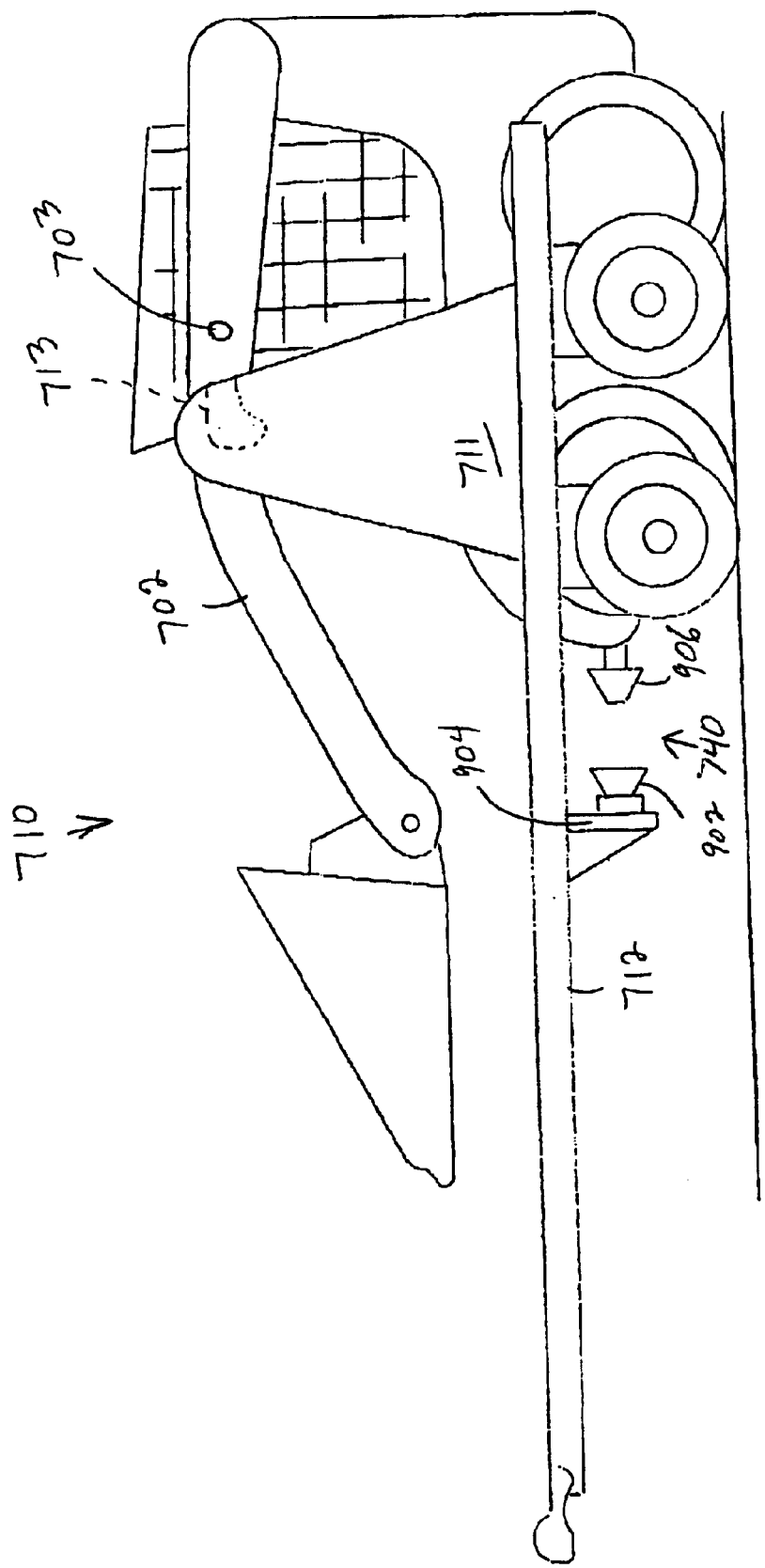
FIG. 28 is a side view of the vehicle and trailer of FIG. 27, with the vehicle shown entering into the trailer.
Figure 29A:
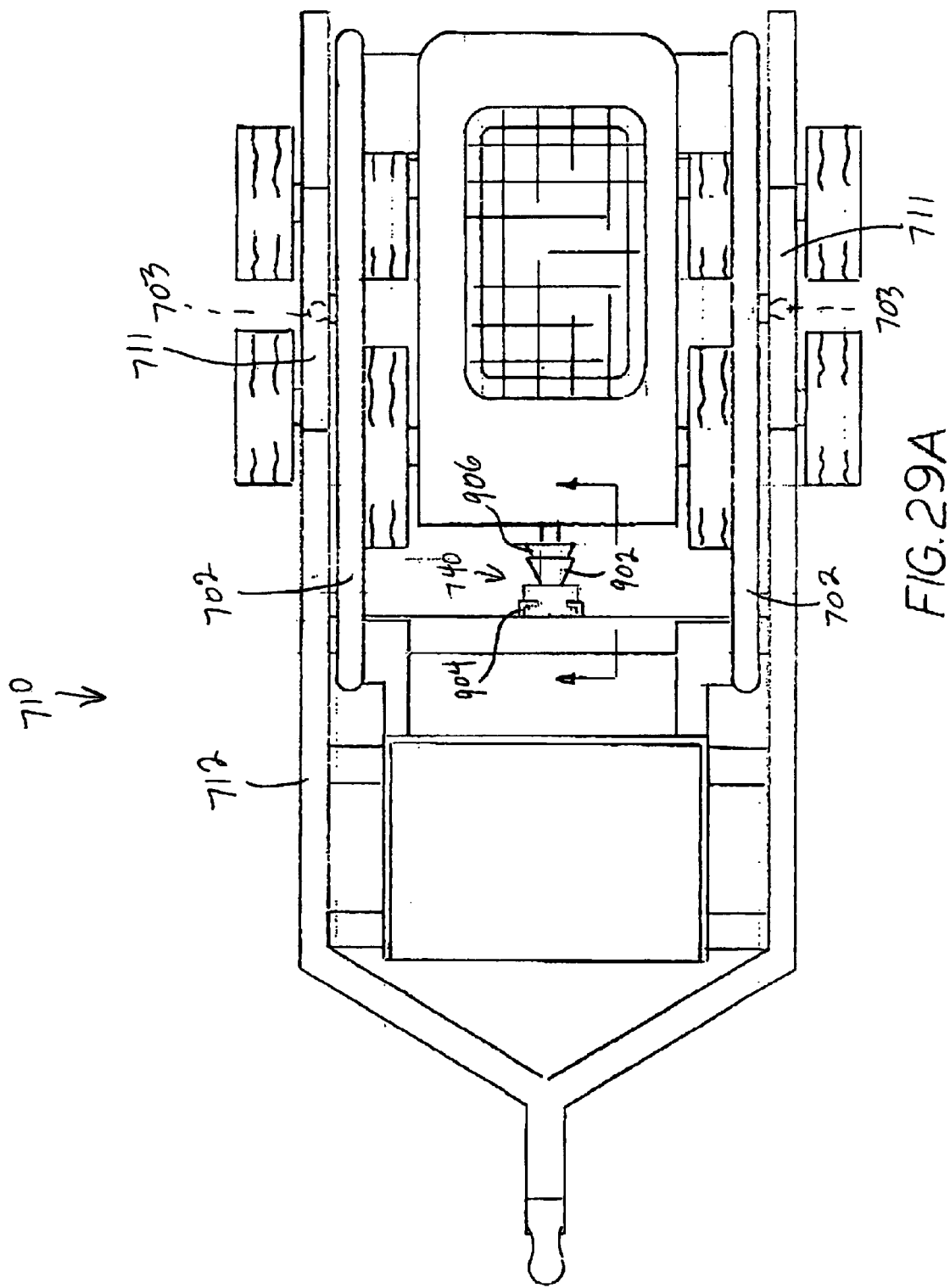
FIG. 29A is a top view of the trailer and vehicle of FIG. 29.
Figure 30:
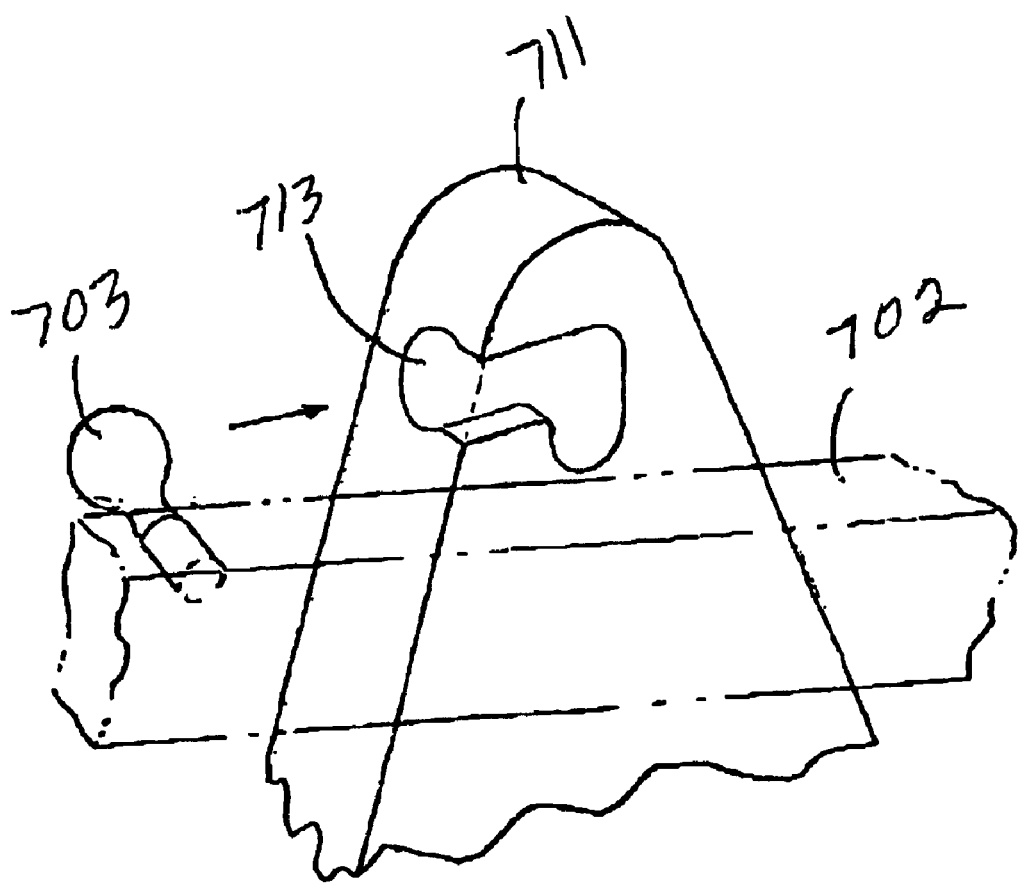
FIG. 30 is a broken-away view taken along the line 30—30 of FIG. 29.

There is also a mounting mechanism 740 for securing the front of the vehicle to the main frame 712 of the trailer 710. In this arrangement, a tapered, conical receptacle 902 is mounted for movement along a vertical track 904 on the main frame of the trailer, and a tapered, conical projection 906 is mounted on the front of the vehicle. FIG. 28 shows the vehicle approaching the trailer. The tapered, conical projection 906 on the vehicle enters the tapered, conical receptacle 902, and the taper helps the vehicle become properly centered, as shown in FIG. 29. Once the conical projection 906 and conical receptacle 902 are mated, there may be a pin or other latching mechanism (not shown), which secures them in the mated position.

The arms 702 are raised or lowered in order to align the projections 703 with the rearwardly-directed openings in their respective slots 713. The projections 703 slide into their slots 713, and the vehicle is driven forward, with the arms 702 gradually moving downwardly, following the slots 713 until the projections 703 are seated at the innermost portion of the slots 713, as shown in FIG. 29. At this point, the vehicle cannot move rearwardly relative to the trailer 710, because the projections 703 are seated in the bottom of the slots 713. The vehicle and trailer are connected at three points—the two ball connections on the left and right sides, and the conical mount at the front. (It may be desirable to make the mount in another shape which does not have a circular cross-section, such as a square cross-section member, in order to prevent the opportunity for pivoting.) The vehicle may then drive along the ground, taking the trailer 710 along with it.

In order to lift the vehicle relative to the trailer, the arms 702 are lowered. Since the projections 703 are fixed relative to the trailer 710, lowering the arms 702 causes the vehicle to be raised relative to the trailer 710. The conical receptacle 902 also moves upwardly, along the track 904, maintaining the forward internal connection between the vehicle and the trailer. Plates (not shown) may be slid from the main frame of the trailer under the wheels of the vehicle in order to help secure the vehicle in the raised position, chains may be used for that purpose, or other mechanisms may be used to secure the vehicle to the trailer in the raised position, so it is not free to swing on the projections 703 and cannot gradually lower back down during transport in the event of leakage of hydraulic fluid in the mechanism that moves the arms up and down. Once the vehicle is raised off of the ground, the trailer 710 may be towed by a towing vehicle connected to the hitch at the end of the towing tongue.

Figure 31:
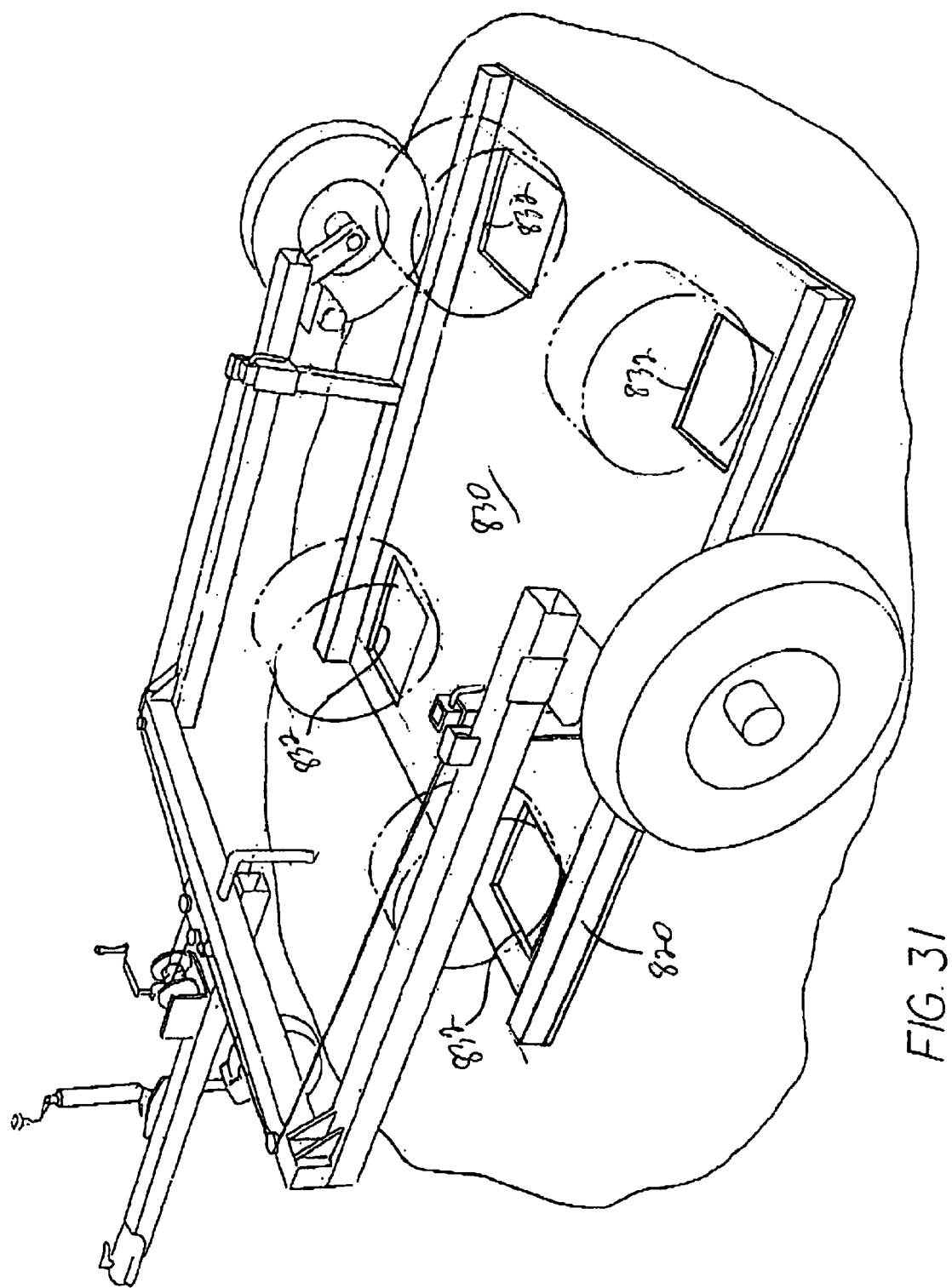
FIG. 31 is a perspective view of another embodiment of a trailer, using a carrier platform with holes cut out to provide openings for the vehicle's driving feet.
Figure 32:
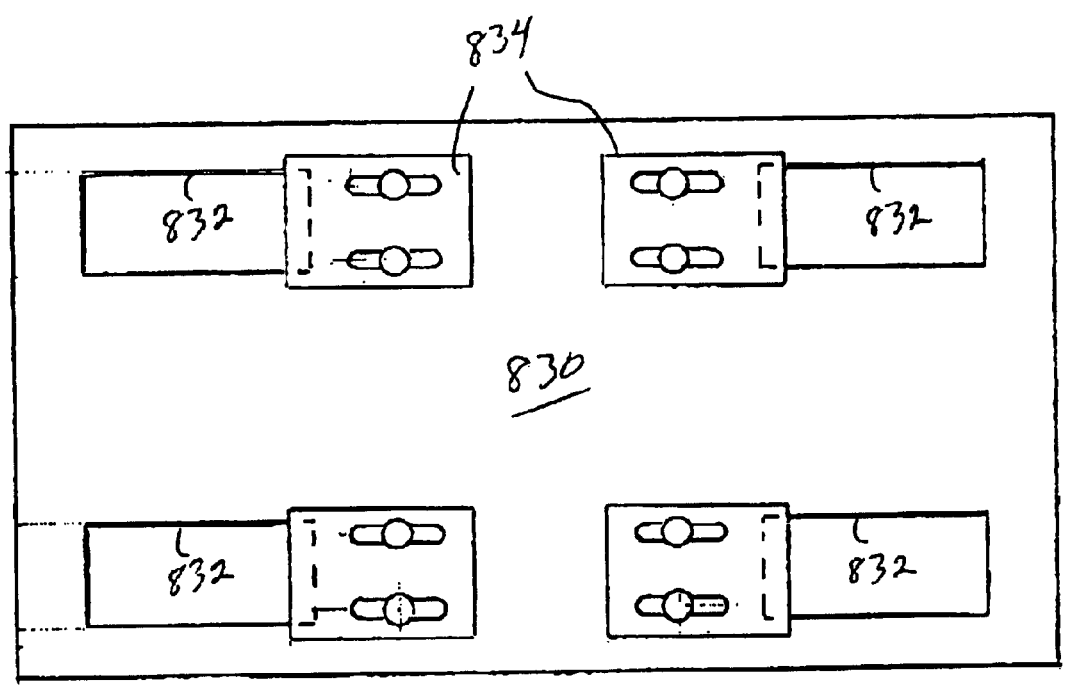
FIG. 32 is a top view of the floor of the trailer of FIG. 31.

FIGS. 31 and 32 show a trailer that is very similar to the first embodiment, except that the carrier frame 820 has a more solid bottom platform 830 rather than the more open platform made up of beams as shown in the first embodiment. The platform 830 defines openings 832, positioned to receive the wheels of the towed vehicle, as shown in phantom. The wheels extend through the openings 832 to reach the ground just as they did in the first embodiment. FIG. 32 shows that slide plates 834 may be used to make the length of the openings 832 adjustable. Slide plates may also be used in the lateral direction, if desired, in order to increase and decrease the widths of the openings. This arrangement functions in the same manner as the first embodiment, with the platform 830 providing the lifting points that contact the vehicle wheels to lift the vehicle. The platform 830 then goes out of contact with the vehicle wheels once the vehicle has been lowered to the ground.

FIGS. 33–34 show another embodiment intended for use with a vehicle having its own movable arms 602. In this embodiment, the bucket or other implement has been removed from the vehicle, leaving the connector portion of the arms 602A free to mate with a receiver or receptacle 650, having the same configuration as the back of a bucket or other implement. The receiver 650 is fixed to the main frame of the trailer. Once the connector portion 602A of the arms 602 has mated with the receiver 650, as shown in FIG. 34, the vehicle is secured to the main frame of the trailer and can be raised and lowered relative to the trailer by pivoting the arms 602. In this embodiment, again it may be desirable to provide additional securing mechanisms for securing the vehicle to the trailer once it is in the raised position. (Also, if desired, the mechanism for securing the vehicle to the trailer may be different when the vehicle is lowered and when the vehicle is raised.)

Figure 35:
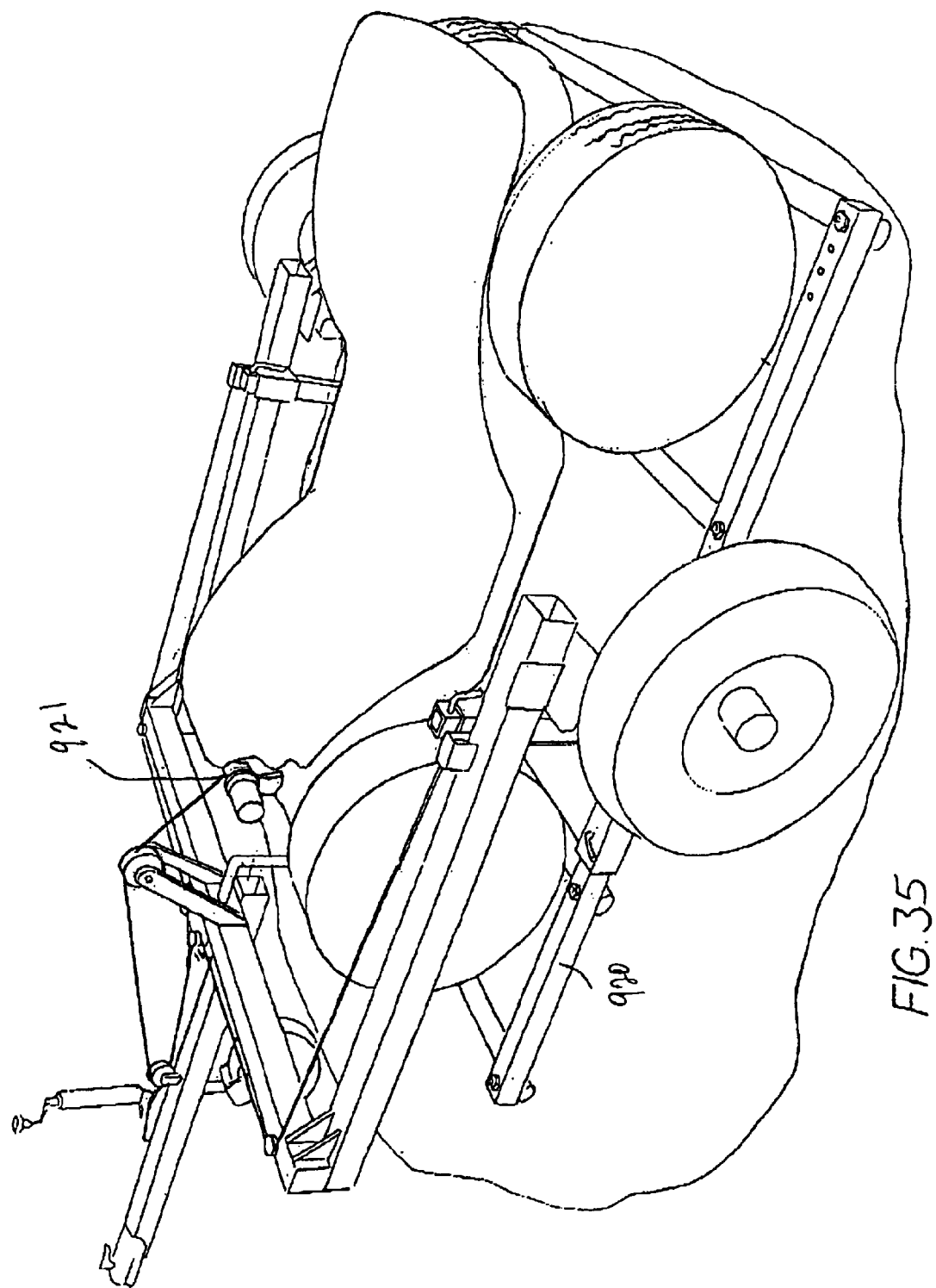
FIG. 35 is a perspective view of another embodiment of a trailer, for use with a vehicle having its own winch.
Figure 36:
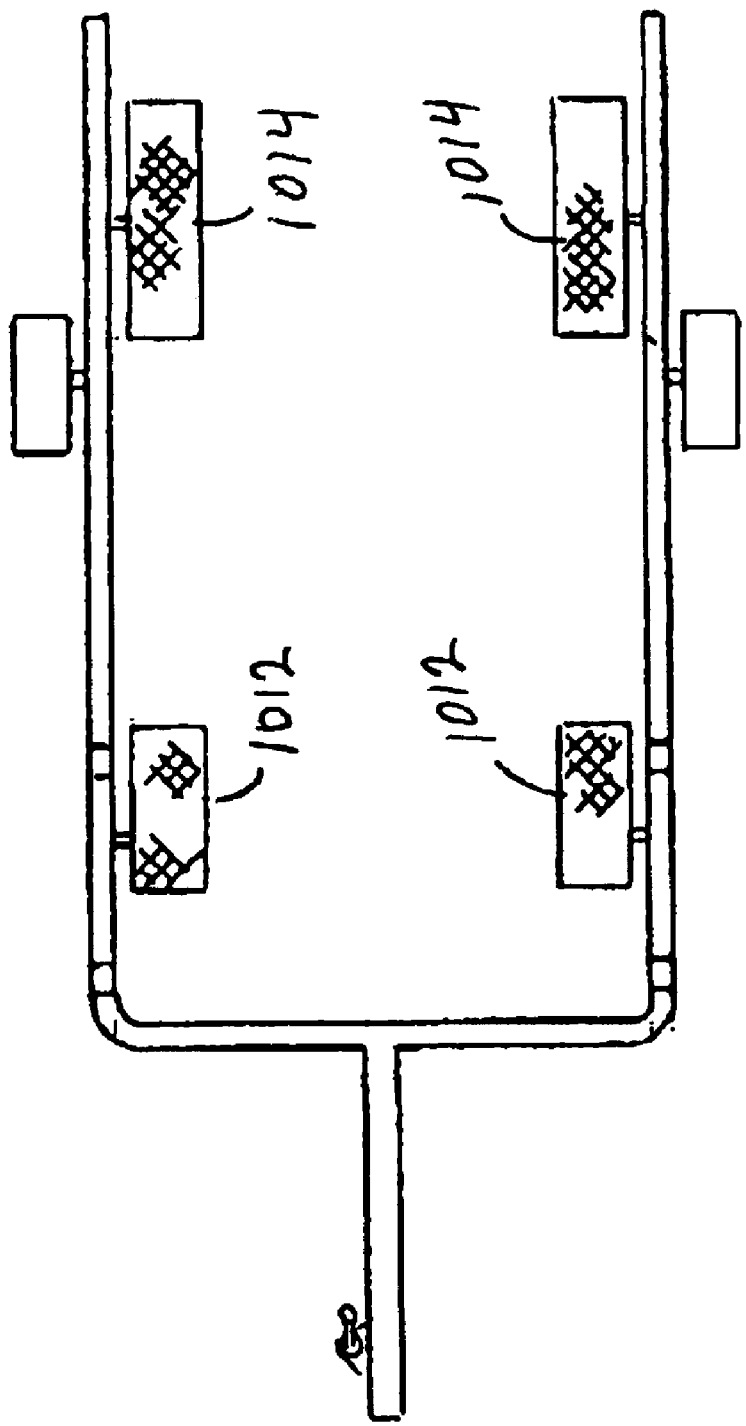
FIG. 36 is a top view of another embodiment of a trailer.

FIG. 35 shows an embodiment that is very similar to the embodiment of FIG. 1, but with the winch 921 mounted on the vehicle rather than on the trailer. Many vehicles already have winches mounted on them, and this embodiment takes advantage of that existing arrangement by using the winch 921 of the vehicle to lift the carrier frame 920. While this embodiment is shown using the same coupling mechanism as the embodiment of FIG. 1, it may be preferred to use the coupling mechanism 740 of FIG. 28. In that case, the winch 921 would pull the projection 906 on the vehicle into the recess 902 on the trailer, and then, once the projection 906 is seated in its recess 902, continuing operation of the winch 921 would lift the vehicle.

Figure 37:
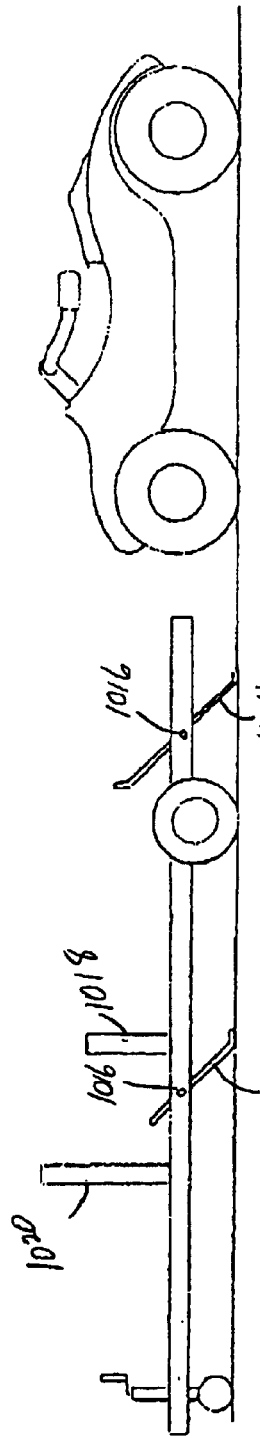
FIG. 37 is a side view of the trailer of FIG. 36 with a vehicle approaching the trailer.

FIGS. 36–41 show an alternative embodiment of a trailer which uses ramps 1012, 1014. This is another embodiment in which the vehicle provides the lifting force to raise and lower itself relative to the main frame of the trailer. In this case, the raising and lowering is done by driving the vehicle over the ramps. As shown in FIG. 37, each ramp 1012, 1014 is mounted to the trailer at a pivot point 1016. This particular embodiment is best suited for a vehicle which has wheels that lie at least partially outside the body of the vehicle so that the rear pivoting ramps 1014 do not interfere with the body of the vehicle.

Figure 38:
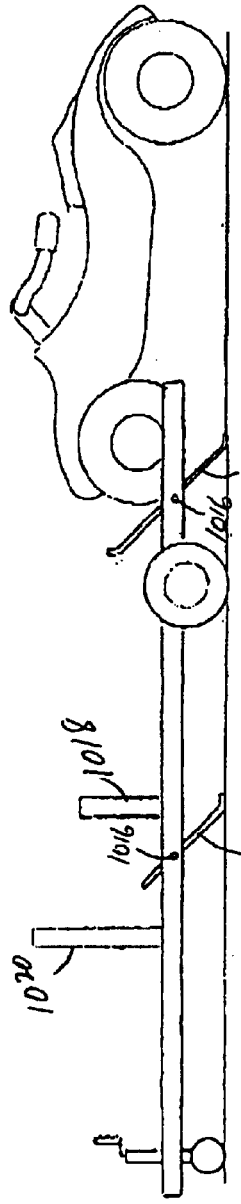
FIG. 38 is the same view as FIG. 37 but with the front tires of the vehicle driving up the rear ramps.
Figure 39:
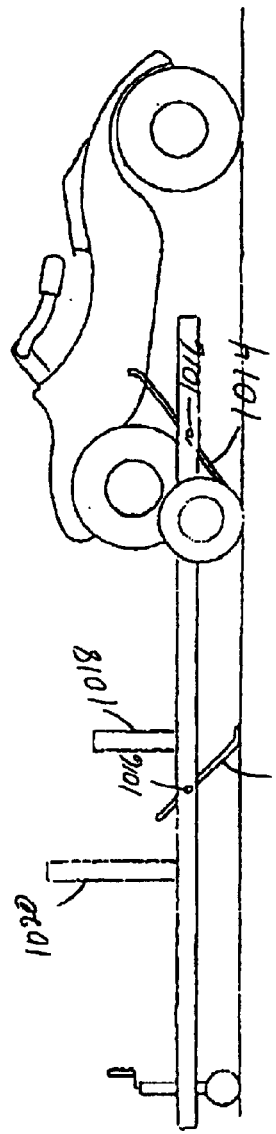
FIG. 39 is the same view as FIG. 38 but with the front tires of the vehicle driving over the rear ramp into the trailer.
Figure 42:
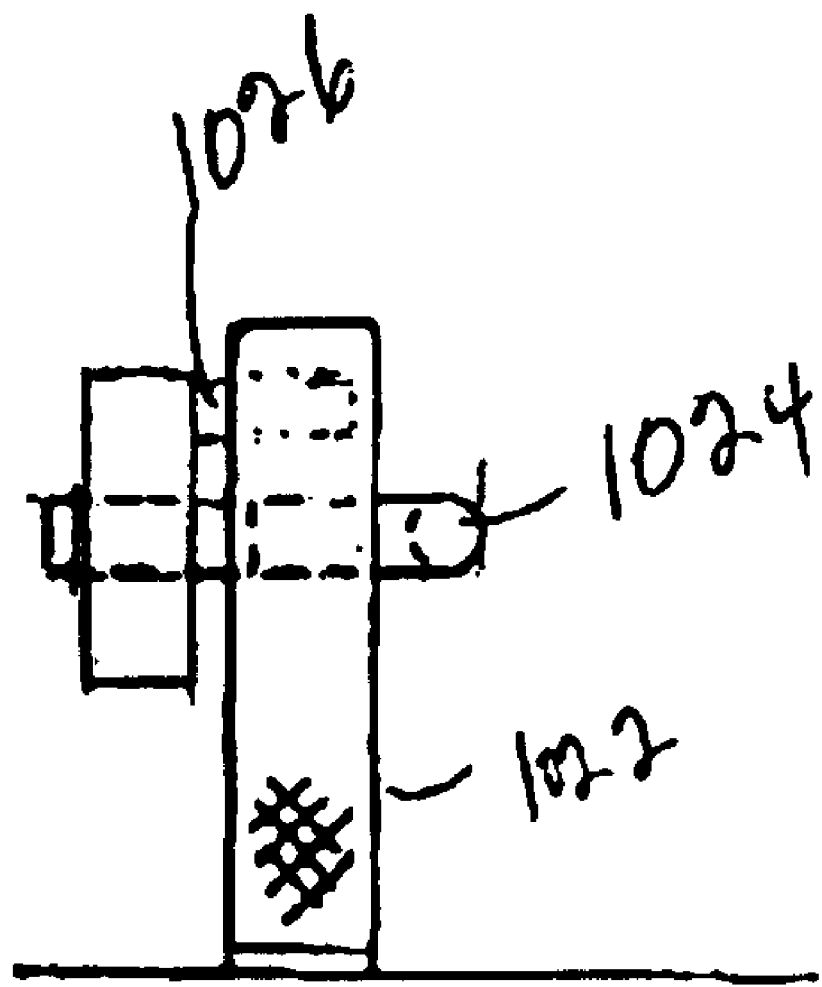
FIG. 42 is a rear view of an alternative rear ramp for the embodiment of FIG. 41.

FIG. 37 shows the vehicle approaching the trailer. The front wheels of the vehicle then drive up the rear ramps 1014 as shown in FIG. 38. Once the vehicle passes the pivot points, the rear ramps 1014 pivot forward, and the vehicle drives down the rear ramps 1014 into the trailer, to the position shown in FIG. 40. At that point, couplers on the left and right front corners of the vehicle mate with couplers 1018 on the left and right sides of the trailer. From this position, the vehicle can drive the trailer. Then, when it is time to tow the vehicle, the vehicle drives forward, with the front wheels driving up the front ramps 1012 and the rear wheels driving up the rear ramps 1014, and the center front of the vehicle couples to the coupler 1020 on the trailer as in previous embodiments. So, in this embodiment, the pivoting ramps serve as a carrier frame, and the vehicle itself provides the motive force for lifting the vehicle up relative to the trailer.

FIGS. 42–49 show a trailer similar to the previous embodiment, but with modifications to the rear ramps. In this embodiment, each of the rear ramps 1022 is mounted on an arm 1024 which can pivot and which can slide horizontally in the left-right direction relative to the main frame of the trailer. FIGS. 43 and 46 show the rear ramps 1022 in the retracted position, overlying the side of the trailer frame. In this position, the vehicle can drive right into the trailer and hitch to the side couplers 1018 for driving the trailer around. When it is time to tow the vehicle, the rear ramps 1022 are slid inwardly and pivot down to the position shown in FIGS. 42, 44, and 47. The upper portion of the rear ramp 1022 rests on a stop 1026, and the lower portion rests on the ground. Then, the vehicle drives up onto both the front and rear ramps 1012,1022 as shown in FIG. 45 and couples to the front coupler 1020. Once in this position, the vehicle is ready to be towed.

FIGS. 50–53 show another alternative embodiment using ramps. This is similar to the embodiment of FIGS. 36–41, except that each of the rear ramps is made in two parts 1030, 1032, each of which pivots relative to the main trailer frame. As shown best in FIG. 53, each of the rear ramp parts 1030, 1032 pivots about its own pivot axis 1016A, 1016B. By making the rear ramp in two parts in this manner, the rear ramp does not project upwardly so as to interfere with the body of the vehicle.

This embodiment functions very similarly to the embodiment of FIGS. 36–41. First, the front wheels of the vehicle drive over the rear portions 1032 of the rear ramps. The rear ramps 1030, 1032 pivot about their axes 1016A, 1016B and form a flat platform when the wheel of the vehicle is between the two pivot axes. Then, when the vehicle moves forward of the front pivot axis 1016A, the front portion 1030 of the rear ramp pivots downwardly, and the front wheels of the vehicle drive down the front portion 1030 to the ground, to the position shown in FIG. 51, where, the vehicle is hitched to the left and right hitches 1018. This is the position from which the vehicle can drive the trailer. When it is time to tow the vehicle, it is driven forward, up onto the front and rear ramps and is coupled to the center front coupler 1020, as shown in FIG. 52.

Figure 54:
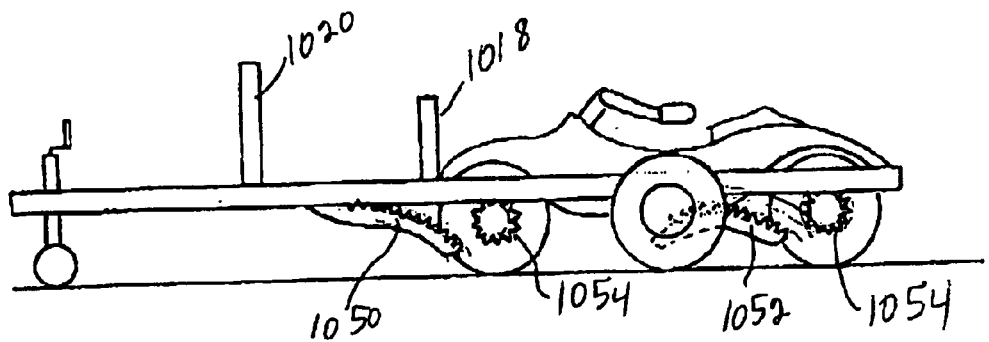
FIG. 54 is a side view of a trailer using alternative types of ramps.
Figure 55:
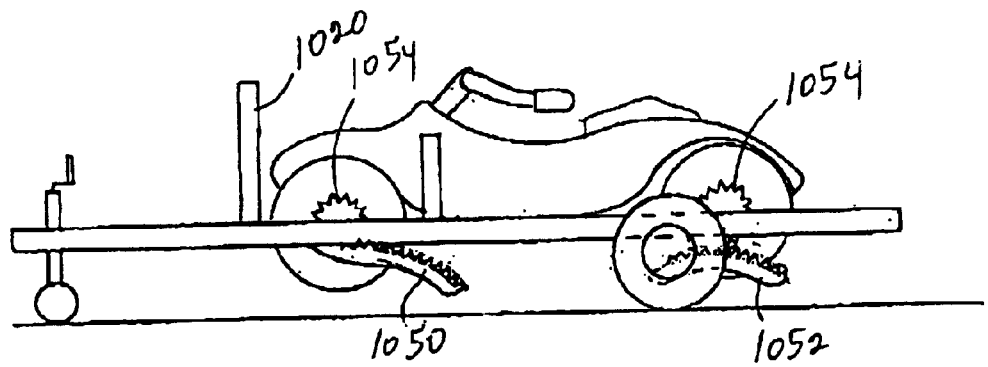
FIG. 55 is the same view as FIG. 54 but with the vehicle having driven up on both ramps.
Figure 56:
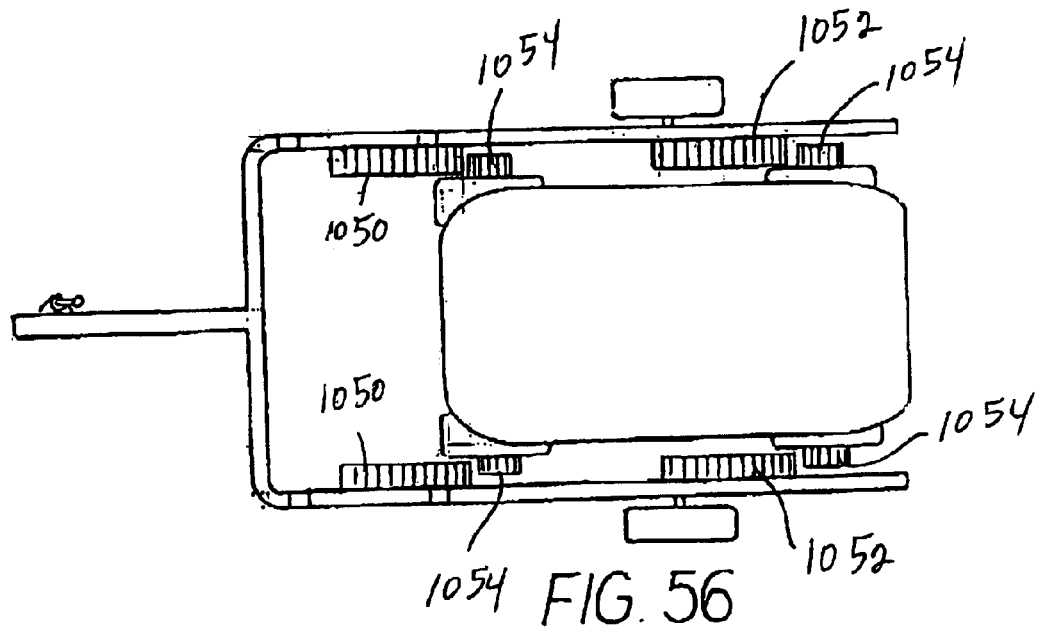
FIG. 56 is a top view of the trailer of FIG. 55.

FIGS. 54–56 show another alternative embodiment using ramps. In this case the ramps 1050, 1052 are stationary on the main trailer frame and terminate at approximately the height of the wheel hubs. The hubs 1054 of the vehicle wheels include projections which mate with the surface of their respective ramps to lift the vehicle up onto the ramp. The ramps and hubs may be made of rubber or some material that will provide a friction grip, or they may have a positive connection, including cooperating teeth and recesses that receive the teeth, similar to a chain and sprocket on a bicycle, or like a rack and pinion or other types of cooperating surfaces. Since the hubs of the wheels cooperate with the ramps, and the hubs are at a substantial height off of the ground, the ramps can be up off of the ground, terminating at approximately the height of the hubs, and do not have to pivot, slide, or otherwise move to get out of the way. In order to use this embodiment, first the front hubs of the vehicle drive up and over the rear ramps 1052 to the position shown in FIG. 54, where the left and right couplers 1018 couple the vehicle to the trailer. In this position, the vehicle can drive the trailer. Then, to tow the vehicle, it is driven forward so that both the front and rear hubs 1054 drive up onto their respective ramps 1050, 1052 to the raised position shown in FIG. 55, and the front coupler 1020 is connected to the vehicle.

While some modifications have already been described, various other modifications may be made to the embodiments described above without departing from the scope of the present invention. For example, while most of the embodiments shown here have the carrier moving vertically relative to the wheels which support the trailer, it could move in other paths, such as at an angle including a horizontal component, as long as there is also a vertical component to the path. While the embodiments shown here have all the driving feet of the vehicle raised for towing the vehicle, the trailer could be made to lift up only some of the wheels, such as the front wheels, while allowing others to remain on the ground as the vehicle is being towed. While cables and a winch generally have been shown as an example of a lifting mechanism, many other types of jacks and lifts are known and could be used, including scissor jacks, screw jacks, and piston-cylinder jacks, or ramps, and the motive force could be provided manually, electrically, hydraulically, and so forth. While a few types of connector mechanisms have been shown, which permit the towed vehicle to drive the trailer while the towed vehicle is inside the trailer, many other types of securing mechanisms could be used for that purpose. While the trailer usually has a U-shape, other shapes could also be used. It would be impossible to describe all the possible variations that could be made within the scope of the present invention, although many variations will be obvious to those skilled in the art and are intended to be protected.

It will be obvious to those skilled in the art that many other modifications may be made to the embodiments described above without departing from the scope of the invention as defined by the following claims.

What is claimed is:

1. A method for carrying a towed vehicle on a trailer having a main frame and including a coupler, for coupling the trailer to a towing vehicle, and at least one trailer wheel, comprising the steps of:

driving the towed vehicle along the ground and into the main frame of the trailer by means of driving feet;

securing to the trailer the towed vehicle that is inside the trailer's main frame;

driving the secured, towed vehicle along the ground, thereby driving the trailer;

raising the towed vehicle relative to the main frame of the trailer to a raised position in which at least one of the driving feet of the towed vehicle is out of contact with the ground;

hitching a towing vehicle to the trailer coupler; and using the towing vehicle to tow the trailer and towed vehicle in the raised position.

2. A method for carrying a towed vehicle as recited in claim 1, wherein the trailer includes a movable frame that is supported on the main frame, and the towed vehicle is supported on the movable frame.

3. A method for carrying a towed vehicle as recited in claim 2, wherein the movable frame defines at least one opening through which the driving feet project for towing the trailer.

4. A method as recited in claim 2, wherein the movable frame includes lift points that contact the vehicle.

5. A method as recited in claim 4, wherein said movable frame includes means for easily changing the relative positions of said lift points to accommodate different vehicles.

6. A method as recited in claim 1, wherein the towed vehicle includes its own lifting mechanism, which is used for lifting the secured, towed vehicle relative to the trailer.

7. A method as recited in claim 6, wherein said towed vehicle includes a winch, which lifts the towed vehicle relative to the trailer.

8. A method as recited in claim 6, wherein said towed vehicle has movable arms, and wherein said arms lift the towed vehicle relative to the trailer.

9. A method as recited in claim 1, wherein the step of raising the vehicle relative to the main frame of the trailer is accomplished by a lifting mechanism on the trailer.

10. A method as recited in claim 1, wherein the step of raising the towed vehicle includes using ramps.

11. A method as recited in claim 10, wherein said ramps pivot relative to the main frame.

12. A method as recited in claim 10, wherein the ramps cooperate with projections from the vehicle hubs.

13. A method for carrying a towed vehicle on a trailer having a main frame, a coupler, and at least one trailer wheel, comprising the steps of:

driving the towed vehicle along the ground and into the main frame of the trailer by means of driving feet;

securing the towed vehicle to the trailer;

driving the trailer by driving the secured, towed vehicle along the ground while the secured towed vehicle is inside the main frame of the trailer; and then raising the towed vehicle relative to the main frame of the trailer to a raised position in which at least one of the driving feet of the towed vehicle is out of contact with the ground.

14. A method as recited in claim 13, and further raising said towed vehicle so that all of said driving feet are out of contact with the ground.

15. A method as recited in claim 13, wherein said towed vehicle includes arms, and wherein said arms are used in raising the towed vehicle relative to the trailer.

* * * * *